(12) United States Patent
Kang

(10) Patent No.: US 12,287,972 B2
(45) Date of Patent: Apr. 29, 2025

(54) STORAGE DEVICE INCLUDING MEMORY CONTROLLER AND OPERATING METHOD THEREOF

(71) Applicant: SK hynix Inc., Gyeonggi-do (KR)

(72) Inventor: Hye Mi Kang, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 96 days.

(21) Appl. No.: 17/942,517

(22) Filed: Sep. 12, 2022

(65) Prior Publication Data

US 2023/0305712 A1    Sep. 28, 2023

(30) Foreign Application Priority Data

Mar. 25, 2022   (KR) .................. 10-2022-0037449

(51) Int. Cl.
    *G06F 3/06*   (2006.01)
    *G06F 12/02*  (2006.01)
    *G06F 12/10*  (2016.01)

(52) U.S. Cl.
    CPC .......... *G06F 3/0617* (2013.01); *G06F 3/0629* (2013.01); *G06F 3/0679* (2013.01); *G06F 12/02* (2013.01); *G06F 12/0292* (2013.01); *G06F 12/10* (2013.01)

(58) Field of Classification Search
    None
    See application file for complete search history.

(56) References Cited

U.S. PATENT DOCUMENTS

| | | | |
|---|---|---|---|
| 2019/0087284 A1* | 3/2019 | Kim | G06F 12/0246 |
| 2020/0125261 A1* | 4/2020 | Byun | G06F 3/064 |
| 2020/0218646 A1* | 7/2020 | Li | G06F 13/28 |
| 2021/0191853 A1* | 6/2021 | Xu | G11C 11/4085 |

FOREIGN PATENT DOCUMENTS

| | | |
|---|---|---|
| KR | 1020180020811 A | 2/2018 |
| KR | 1020190092054 A | 8/2019 |
| KR | 1020200043676 A | 4/2020 |

\* cited by examiner

*Primary Examiner* — Yaima Rigol
(74) *Attorney, Agent, or Firm* — IP & T GROUP LLP

(57) ABSTRACT

A memory controller includes: a program operation controller configured to control a memory device to store data and individual mapping information; a mapping information storage configured to store therein mapping information; a mapping information update controller configured to control the memory device to store the mapping information in a second memory block; perform an update operation of updating the mapping information, and delay, when sequentiality of a predetermined number or more of logical addresses is maintained with respect to the predetermined time, the update operation until the sequentiality is broken; and a Sudden Power Off Recovery (SPOR) controller configured to receive the individual mapping information, recover the mapping information for the data stored in the page during a delay section and provide the recovered mapping information to the mapping information storage.

18 Claims, 17 Drawing Sheets

FIG. 8

| WHEN N IS INCREASED | DECREASE IN WRITE OPERATION TIME ACCORDING TO REQUEST OF HOST, INCREASE IN RECOVERY COST IN OCCURRENCE OF SPO |
|---|---|
| WHEN N IS DECREASED | INCREASE IN WRITE OPERATION TIME ACCORDING TO REQUEST OF HOST, DECREASE IN RECOVERY COST IN OCCURRENCE OF SPO |

FIG. 12A

P2L TABLE

| P2L INDEX | PHYSICAL BLOCK ADDRESS | LOGICAL BLOCK ADDRESS |
|---|---|---|
| 0 | PhyAddr0 | |
| 1 | PhyAddr1 | |
| 2 | PhyAddr2 | |
| 3 | PhyAddr3 | |
| 4 | PhyAddr4 | |
| 5 | PhyAddr5 | |
| ⋮ | ⋮ | |

STORAGE DEVICE INCLUDING MEMORY CONTROLLER AND OPERATING METHOD THEREOF

CROSS-REFERENCE TO RELATED APPLICATION

The present application claims priority under 35 U.S.C. § 119(a) to Korean patent application number 10-2022-0037449, filed on Mar. 25, 2022, the entire disclosure of which is incorporated herein by reference.

BACKGROUND

Field of Invention

The present disclosure generally relates to an electronic device, and more particularly, to a storage device including a memory controller and an operating method thereof.

Description of Related Art

A storage device is a device which stores data under the control of a host device such as a computer or a smart phone. The storage device may include a memory device for storing data and a memory controller for controlling the memory device. The memory device is classified into a volatile memory device and a nonvolatile memory device.

The volatile memory device is a memory device in which data is stored only when power is supplied, and stored data disappears when the supply of power is interrupted. The volatile memory device may include a Static Random Access Memory (SRAM), a Dynamic Random Access Memory (DRAM), and the like.

The nonvolatile memory device is a memory device in which data does not disappear even when the supply of power is interrupted. The nonvolatile memory device may include a Read Only Memory (ROM), a Programmable ROM (PROM), an Electrically Programmable ROM (EPROM), an Electrically Erasable ROM (EEROM), a flash memory, and the like.

SUMMARY

Various embodiments of the present disclosure provide a storage device capable of shortening a write time and a recovery time of mapping data after a sudden power off occurs.

In accordance with an aspect of the present disclosure, there is provided a memory controller including: a program operation controller configured to control a memory device to store data and individual mapping information as logical block information corresponding to a physical block address of each page in which the data is stored in a first memory block included in the memory device; a mapping information storage configured to store mapping information including information on logical block addresses and physical block addresses; a mapping information update controller configured to control the memory device to store the mapping information in a second memory block included in the memory device, to perform an update operation of updating the mapping information stored in the second memory block for each predetermined time, and to, when sequentiality of a predetermined number or more of logical block addresses is maintained with respect to the predetermined time, delay the update operation until the sequentiality is suspended; and a Sudden Power Off Recovery (SPOR) controller configured to, when sudden power off occurs while the data is stored in the first memory block, receive the individual mapping information provided from the memory device to recover the mapping information of the mapping information storage, wherein, when the update operation is delayed, the SPOR controller recovers mapping information on data stored in the memory device during a delay period as a period from the predetermined time to a time at which the sudden power off occurs, based on logical block address information and physical bock address information of data stored at the predetermined time, obtained from the memory device, and logical block address information of data stored lastly before the sudden power off occurs, and provides the recovered mapping information to the mapping information storage.

In accordance with another aspect of the present disclosure, there is provided a storage device including: a memory device configured to store, in a first memory block, data and individual mapping information as logical block address information corresponding to a physical block address of each page in which the data is stored, store mapping information including the logical block address information and physical block address information in a second memory block, and update mapping information stored in the second memory block for each predetermined time; and a memory controller including a mapping information storage configured to store the mapping information, the memory controller controlling the memory device to, when sequentiality of a predetermined number or more of logical block addresses is maintained with respect to the predetermined time, delay an update operation until the sequentiality is suspended, wherein, when a sudden power off occurs while the data is stored in the first memory block, after the update operation is delayed, the memory controller performs an operation of recovering mapping information on data stored in the memory device in a delay period as a period from the predetermined time to a time at which the sudden power off occurs, based on logical block address information and physical bock address information of data stored at the predetermined time, obtained from the memory device, and logical block address information of data stored lastly before the sudden power off occurs, and storing the recovered mapping information in the mapping information storage.

In accordance with still another aspect of the present disclosure, there is provided a method of operating a storage device, the method including: storing, in a first memory block included in a memory device, data and individual mapping information as logical block address information corresponding to a physical block address of each page in which the data is stored; storing mapping information including the logical block address information and physical block address information in a second memory block included in the memory device and a mapping information storage in a memory controller; updating mapping information stored in the second memory block for each predetermined time; when sequentiality of a predetermined number or more of logical block addresses is maintained with respect to the predetermined time, delaying an update operation until the sequentiality is suspended; when sudden power off occurs while the data is stored in the first memory block, after the update operation is delayed, recovering mapping information on data stored in the memory device in a delay period as a period from the predetermined time to a time at which the sudden power off occurs, based on logical block address information and physical bock address information of data stored at the predetermined time and logical block address information of data stored lastly before the sudden power off occurs; and storing the recovered mapping information in the mapping information storage.

BRIEF DESCRIPTION OF THE DRAWINGS

Various embodiments of the present disclosure will now be described more fully hereinafter with reference to the accompanying drawings; however, the embodiments may be embodied in different forms and should not be construed as limited to the embodiments set forth herein. Rather, these embodiments are provided so that this disclosure will be thorough and complete, and will fully convey the scope of the embodiments to those skilled in the art.

In the drawing figures, dimensions may be exaggerated for clarity of illustration. It will be understood that when an element is referred to as being "between" two elements, it can be the only element between the two elements, or one or more intervening elements may also be present. Like reference numerals refer to like elements throughout.

FIG. 8 is a diagram illustrating a program operation time according to a change in update period of mapping information and recovery cost when a Sudden Power Off (SPO) occurs in accordance with an embodiment of the present disclosure.

FIGS. 12A and 12B are diagrams illustrating an SPOR operation which the storage device performs when SPO occurs while the storage device stores data according to a request of the host in accordance with an embodiment of the present disclosure.

DETAILED DESCRIPTION

The specific structural or functional description disclosed herein is merely illustrative for the purpose of describing embodiments according to the concept of the present disclosure. The embodiments according to the concept of the present disclosure can be implemented in various forms, and cannot be construed as limited to the embodiments set forth herein.

Hereinafter, various embodiments of the present disclosure will be described in detail with reference to the accompanying drawings in order for those skilled in the art to be able to readily implement the technical spirit of the present disclosure.

Figure 1:
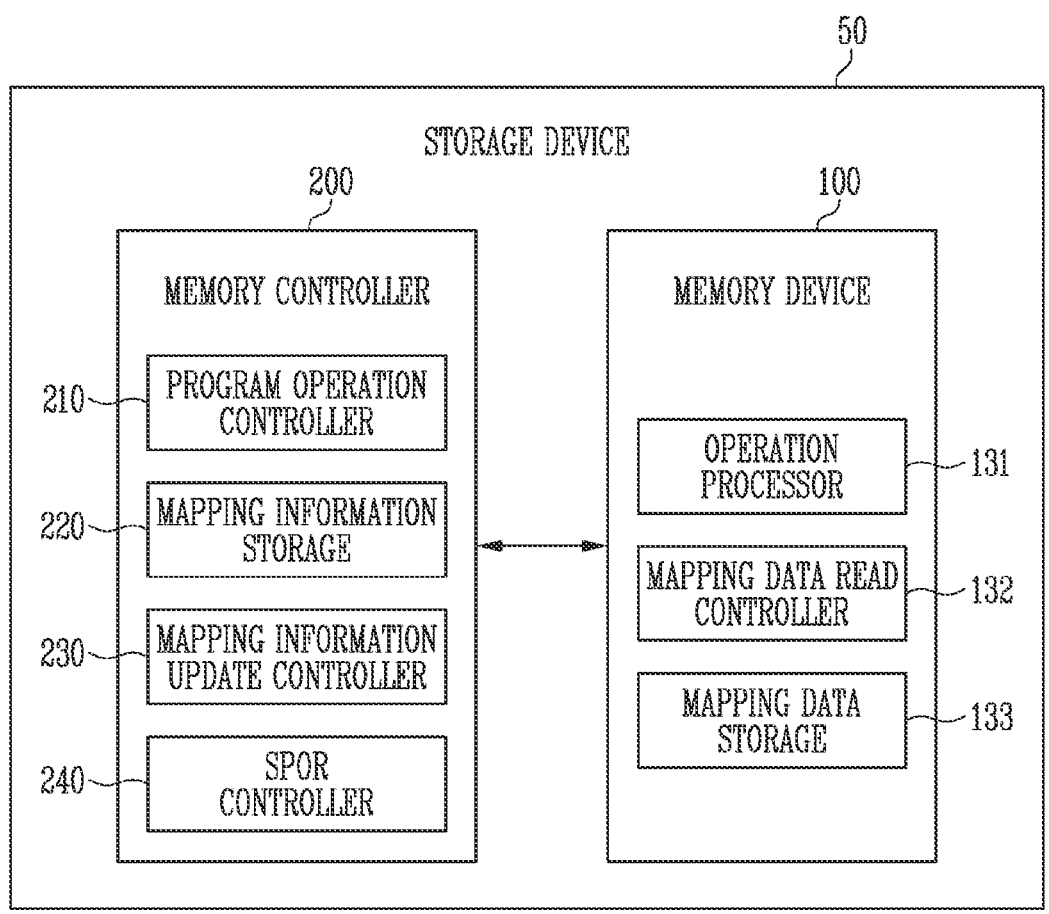
FIG. 1 is a diagram illustrating a storage device in accordance with an embodiment of the present disclosure.

FIG. 1 is a diagram illustrating a storage device in accordance with an embodiment of the present disclosure.

Referring to FIG. 1, the storage device 50 may include a memory device 100 and a memory controller 200 configured to control the memory device 100. The storage device 50 may be a device for storing data under the control of a host, such as a mobile phone, a smart phone, an MP3 player, a laptop computer, a desktop computer, a game console, a TV, a tablet PC or an in-vehicle infotainment.

The storage device 50 may be manufactured as one of various types of storage devices according to a host interface that is a communication scheme with the host. For example, the storage device 50 may be configured as one of various types of storage devices which include a Solid State Drive (SSD), a Multi-Media Card (MMC) such as an eMMC, RS-MMC or micro-MMC, an SD (Secure Digital) card such as an SD, a mini-SD or a micro-SD, a Universal Serial Bus (USB) storage device, a Universal Flash Storage (UFS) device, a Non-Volatile Memory express (NVMe) storage device, a Personal Computer Memory Card International Association (PCMCIA) card-type storage device, a Peripheral Component Interconnection (PCI) card-type storage device, a PCI-express (PCI-e) card-type storage device, a Compact Flash (CF) card, a smart media card, and a memory stick.

The storage device 50 may be manufactured as one of various package types. For example, the storage device 50 may be manufactured as one of various package types such as a Package-On-Package (POP), a System-In-Package (SIP), a System-On-Chip (SOC), a Multi-Chip Package (MCP), a Chip-On-Board (COB), a Wafer-level Fabricated Package (WFP), and a Wafer-level Stack Package (WSP).

The memory device 100 may store data. The memory device 100 operates under the control of the memory controller 200. The memory device 100 may include a memory cell array including a plurality of memory cells for storing data. The memory cell array may include a plurality of memory blocks. Each memory block may include a plurality of memory cells. One memory block may include a plurality of pages. In an embodiment, the page may be a unit for storing data in the memory device 100 or reading data stored in the memory device 100. The memory block may be a unit for erasing data. In an embodiment, the memory device 100 may be a Double Data Rate Synchronous Dynamic Random Access Memory (DDR SDRAM), a Low Power Double Data Rate 4 (LPDDR4) SDRAM, a Graphics Double Data Rate (GDDR) SRAM, a Low Power DDR (LPDDR), a Rambus Dynamic Random Access Memory (RDRAM), a NAND flash memory, a vertical NAND flash memory, a NOR flash memory, a Resistive Random Access Memory (RRAM), a Phase-Change Random Access Memory (PRAM), a Magnetoresistive Random Access Memory (MRAM), a Ferroelectric Random Access Memory (FRAM), a Spin Transfer Torque Random Access Memory (STT-RAM), or the like. In this specification, for convenience of description, a case where the memory device 100 is a NAND flash memory is described.

The memory device 100 receives a command and an address from the memory controller 200 and accesses an area selected by the address in the memory cell array. That is, the memory device 100 may perform an operation instructed by the command on the area selected by the address. For example, the memory device 100 may perform a write (program) operation, a read operation, and an erase operation. In the program operation, the memory device 100 may program data in the area selected by the address. In the read operation, the memory device 100 may read data from the area selected by the address. In the erase operation, the memory device 100 may erase data stored in the area selected by the address.

In an embodiment, the memory device 100 may include an operation processor 131, a mapping data read controller 132, and a mapping data storage 133.

The operation processor 131 may control a peripheral circuit in the memory device 100 to perform a program operation of storing data in a selected area in response to a program command of the memory controller 200. In an embodiment, in the program operation, the operation processor 131 may store, in each page, individual mapping information as physical block address information corresponding to a logical block address of each page, together with data which the memory controller 200 provides.

When the mapping data read controller 132 receives a command requesting mapping information, which is provided from the memory controller 200, the mapping data read controller 132 may control the peripheral circuit to perform an operation of reading mapping information from the selected area included in the memory device 100. The mapping data read controller 132 may control the peripheral circuit to store the mapping information read from the selected area in the mapping data storage 133.

The mapping data storage 133 may store logical block address information and physical block address information of data stored in a memory block. The mapping data storage 133 may provide logical block address information or physical block address information of data corresponding to a request of the memory controller 200 to the memory controller 200 according to the request of the memory controller 200.

The memory controller 200 may control overall operations of the storage device 50.

When power is applied to the storage device 50, the memory controller 200 may execute firmware (FW). When the memory device 100 is a flash memory device, the memory controller 200 may execute FW such as a Flash Translation Layer (FTL) for controlling communication between the host and the memory device 100.

In an embodiment, the memory controller 200 may receive data and a Logical Block Address (LBA) from the host, and translate the LBA into a Physical Block Address (PBA) representing addresses of memory cells included in the memory device 100, in which data is to be stored.

The memory controller 200 may control the memory device 100 to perform a program operation, a read operation, an erase operation, or the like in response to a request from the host. In the program operation, the memory controller 200 may provide a program command, a PBA, and data to the memory device 100. In the read operation, the memory controller 200 may provide a read command and a PBA to the memory device 100. In the erase operation, the memory controller 200 may provide an erase command and a PBA to the memory device 100.

In an embodiment, the memory controller 200 may autonomously generate a command, an address, and data without any request from the host, and transmit the command, the address, and the data to the memory device 100. For example, the memory controller 200 may provide the command, the address, and the data to the memory device 100 to perform background operations such as a program operation for wear leveling and a program operation for garbage collection.

In an embodiment, the memory controller 200 may control at least two memory devices 100. The memory controller 200 may control the memory devices according to an interleaving scheme to improve operational performance.

The host may communicate with the storage device 50, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a Non-Volatile Memory express (NVMe), a universal flash storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

In an embodiment, the memory controller 200 may include a program operation controller 210, a mapping information storage 220, a mapping information update controller 230, and a Sudden Power Off Recovery (SPOR) controller 240.

The program operation controller 210 may control the memory device 100 to perform a program operation on the memory device 100 according to a request of the host. In an embodiment, the program operation controller 210 may control the memory device 100 to store data or individual mapping information according to the request of the host in a memory block among the plurality of memory blocks included in the memory device 100. The individual mapping information may mean physical block address information corresponding to a logical block address of each page in which data is stored.

The mapping information storage 220 may store mapping information including information on logical block addresses and physical block addresses corresponding to the logical block addresses according to the request of the host.

The mapping information update controller 230 may store mapping information in a memory block among the plurality of memory blocks included in the memory device 100. The mapping information update controller 230 may perform an update operation of updating the mapping information stored in the memory block for each predetermined time. When a predetermined number or more of logical block addresses maintain sequentiality with respect to the predetermined time, the mapping information update controller 230 may control the memory device 100 to delay the update operation until the sequentiality is broken. The predetermined time may mean a time amount for which a program operation corresponding to a default number (e.g., N number, see FIG. 7) of logical addresses is completed. In this disclosure, the update of mapping information for each predetermined time, i.e., the periodical update of mapping information may mean that the mapping information is updated whenever the N number of logical-to-physical (L2P) map entries are generated for the mapping information. In this disclosure, the periodicity may be related to a number of logical addresses. In this disclosure, a map entry may be information representing a relationship between a single logical address and a corresponding physical address.

The SPOR controller 240 may receive individual mapping information provided from the memory device 100, when a sudden power off occurs while data is stored in a memory block. The SPOR controller 240 may perform an operation of recovering the mapping information included in the mapping information storage 220 by using the individual mapping information provided from the memory device 100. When the update operation is delayed, the SPOR controller 240 may receive, from the memory device 100, logical block address information and physical block address information of data stored at the predetermined time and logical block address information of data lastly stored before sudden power off occurs. The SPOR controller 240 may perform an operation of recovering mapping information on data stored in the memory device 100 during a delay section, based on the information provided from the memory device 100. The delay section may mean a period from a predetermined time to a time at which a sudden power off occurs. The SPOR controller 240 may provide the recovered mapping information to the mapping information storage 220.

Figure 2:
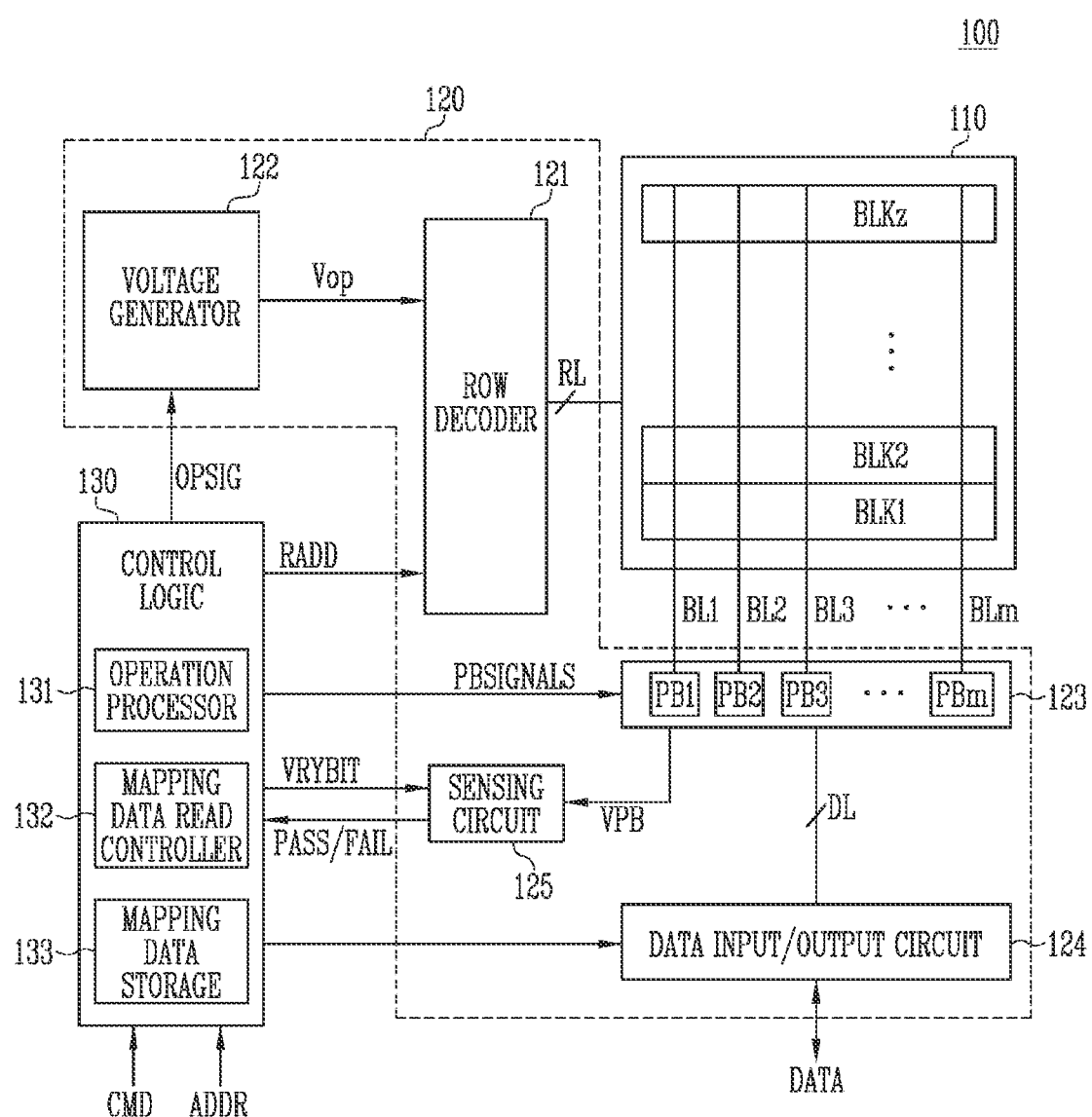
FIG. 2 is a diagram illustrating a structure of a memory device shown in FIG. 1 in accordance with an embodiment of the present disclosure.

FIG. 2 is a diagram illustrating a structure of the memory device shown in FIG. 1 in accordance with an embodiment of the present disclosure.

Referring to FIG. 2, the memory device 100 may include a memory cell array 110, a peripheral circuit 120, and a control logic 130.

The memory cell array 110 includes a plurality of memory blocks BLK1 to BLKz. The plurality of memory blocks BLK1 to BLKz are connected to a row decoder 121 through row lines RL. The plurality of memory blocks BLK1 to BLKz are connected to a read/write circuit 123 through bit lines BL1 to BLm. Each of the plurality of memory blocks BLK1 to BLKz includes a plurality of memory cells. In an embodiment, the plurality of memory cells may be nonvolatile memory cells. Memory cells connected to the same word line among the plurality of memory cells may be defined as one physical page. That is, the memory cell array 110 may be configured with a plurality of physical pages.

Each of the memory cells of the memory device may be configured as a Single Level Cell (SLC) storing one data bit, a Multi-Level Cell (MLC) storing two data bits, a Triple Level Cell (TLC) storing three data bits, or a Quad Level Cell (QLC) storing four data bits.

The peripheral circuit 120 may include the row decoder 121, a voltage generator 122, the read/write circuit 123, a data input/output circuit 124, and a sensing circuit 125.

The peripheral circuit 120 drives the memory cell array 110. For example, the peripheral circuit 120 may drive the memory cell array 110 to perform a program operation, a read operation, and an erase operation.

The row decoder 121 is connected to the memory cell array 110 through the row lines RL. The row lines RL may include at least one source select line, a plurality of word lines, and at least one drain select line.

The row decoder 121 decodes a row address RADD received from the control logic 130. The row decoder 121 selects at least one memory block among the memory blocks BLK1 to BLKz according to the decoded address. Also, the row decoder 121 may select at least one word line of a selected memory block to apply voltages generated by the voltage generator 122 to the at least one word line according to the decoded address.

For example, in a program operation, the row decoder 121 may apply a program voltage to the selected word line, and apply a program pass voltage having a level lower than that of the program voltage to unselected word lines. In a program verify operation, the row decoder 121 may apply a verify voltage to the selected word line, and apply a verify pass voltage higher than the verify voltage to the unselected word lines. In a read operation, the row decoder 121 may apply a read voltage to the selected word line, and apply a read pass voltage higher than the read voltage to the unselected word lines.

In accordance with an embodiment, an erase operation of the memory device 100 may be performed in units of memory blocks. In the erase operation, an address ADDR input to the memory device 100 includes a block address. The row decoder 121 may decode the block address, and select one memory block according to the decoded block address. In the erase operation, the row decoder 121 may apply a ground voltage to word lines connected to the selected memory block.

The voltage generator 122 may generate a plurality of voltages by using an external power voltage supplied to the memory device 100. The voltage generator 122 is operated under the control of the control logic 130.

In an embodiment, the voltage generator 122 may generate an internal power voltage by regulating the external power voltage. The internal power voltage generated by the voltage generator 122 is used as an operation voltage of the memory device 100.

In an embodiment, the voltage generator 122 may generate a plurality of voltages by using the external power voltage or the internal power voltage. The voltage generator 122 may generate various voltages required by the memory device 100. For example, the voltage generator 122 may generate a plurality of erase voltages, a plurality of program voltages, a plurality of pass voltages, a plurality of select read voltages, and a plurality of unselect read voltages.

In order to generate a plurality of voltages having various voltage levels, the voltage generator 122 may include a plurality of pumping capacitors for receiving the internal power voltage, and generate the plurality of voltages by selectively activating the plurality of pumping capacitors under the control of the control logic 130.

The plurality of generated voltages may be supplied to the memory cell array 110 by the row decoder 121.

The read/write circuit 123 includes first to mth page buffers PB1 to PBm. The first to mth page buffers PB1 to PBm are connected to the memory cell array 110 through the respective first to mth bit lines BL1 to BLm. The first to mth page buffers PB1 to PBm is operated under the control of the control logic 130.

The first to mth page buffers PB1 to PBm communicate data DATA with the data input/output circuit 124. In a program operation, the first to mth page buffers PB1 to PBm receive data DATA to be stored through the data input/output circuit 124 and data lines DL.

In a program operation, the first to mth page buffers PB1 to PBm may transfer, to selected memory cells through the bit lines BL1 to BLm, data DATA received through the data input/output circuit 124 when a program pulse is applied to a selected word line. The selected memory cells are programmed according to the transferred data DATA. A memory cell connected to a bit line through which a program allow voltage (e.g., a ground voltage) is applied may have an increased threshold voltage. A threshold voltage of a memory cell connected to a bit line through which a program inhibit voltage (e.g., a power voltage) is applied may be maintained. In a program verify operation, the first to mth page buffers PB1 to PBm read data DATA stored in the selected memory cells from the selected memory cells through the bit lines BL1 to BLm.

In a read operation, the read/write circuit 123 may read data DATA from memory cells of a selected page through the bit lines BL1 to BLm, and store the read data DATA in the first to mth page buffers PB1 to PBm.

In an erase operation, the read/write circuit 123 may float the bit lines BL1 to BLm. In an embodiment, the read/write circuit 123 may include a column select circuit.

The data input/output circuit 124 is connected to the first to mth page buffers PB1 to PBm through the data lines DL. The data input/output circuit 124 is operated under the control of the control logic 130.

The data input/output circuit 124 may include a plurality of input/output buffers (not shown) that receive input data DATA. In a program operation, the data input/output circuit 124 may receive data DATA to be stored from an external controller (not shown). In a read operation, the data input/output circuit 124 outputs, to the external controller, data transmitted from the first to mth page buffers PB1 to PBm included in the read/write circuit 123.

In a read operation or verify operation, the sensing circuit 125 may generate a reference current in response to an allow bit VRYBIT signal generated by the control logic 130, and output a pass signal or fail signal PASS/FAIL to the control logic 130 by comparing a sensing voltage VPB received from the read/write circuit 123 and a reference voltage generated by the reference current.

In an embodiment, the sensing circuit 125 may include a current sensing circuit which counts a fail bit number as a number of program fail cells among target cells.

The control logic 130 may be connected to the row decoder 121, the voltage generator 122, the read/write circuit 123, the data input/output circuit 124, and the sensing circuit 125. The control logic 130 may control overall operations of the memory device 100. The control logic 130 may operate in response to a command CMD transferred from an external device.

The control logic 130 may control the peripheral circuit 120 by generating several signals in response to a command CMD and an address ADDR. For example, the control logic 130 may generate an operation signal OPSIG, the row address RADD, a read/write circuit control signal PBSIGNALS, and the allow bit VRYBIT in response to the command CMD and the address ADDR. The control logic 130 may output the operation signal OPSIG to the voltage generator 122, output the row address RADD to the row decoder 121, output the read/write circuit control signal PBSIGNALS to the read/write circuit 123, and output the allow bit VRYBIT to the sensing circuit 125. Also, the control logic 130 may determine whether the verify operation has passed or failed in response to the pass or fail signal PASS/FAIL output by the sensing circuit 125.

In an embodiment, the control logic 130 may include the operation processor 131, the mapping data read controller 132, and the mapping data storage 133.

The operation processor 131 may control the peripheral circuit 120 to perform a program operation of storing data in a selected area in response to a program command of the memory controller. In an embodiment, in the program operation, the operation processor 131 may store, in each page, individual mapping information together with data which the memory controller 200 provides.

The mapping data read controller 132 may control the peripheral circuit 120 to perform an operation of reading individual mapping information from a first memory block among the plurality of memory blocks included in the memory cell array 110. The mapping data read controller 132 may control the peripheral circuit 120 to perform an operation of reading mapping information from a second memory block among the plurality of memory blocks included in the memory cell array 110.

The mapping data storage 133 may store the read individual mapping information and the read mapping information under the control of the mapping data read controller 132. The mapping data storage 133 may provide the memory controller with logical block address information and physical block address information of data stored at a predetermined time and logical block address information of data lastly stored before a sudden power off occurs. The mapping data storage 133 may provide physical block address information of a reference page to the memory controller. The reference page may be a page of data stored in the first memory block at a time at which mapping information is lastly updated before the sudden power off occurs.

Figure 3:
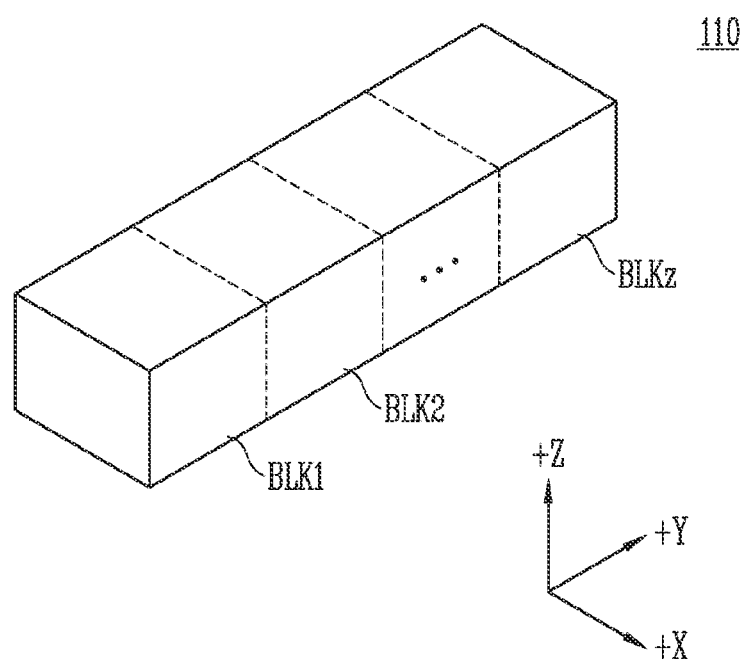
FIG. 3 is a diagram illustrating a memory cell array shown in FIG. 2 in accordance with an embodiment of the present disclosure.

FIG. 3 is a diagram illustrating the memory cell array shown in FIG. 2 in accordance with an embodiment of the present disclosure.

Referring to FIG. 3, the memory cell array 110 may include a plurality of memory blocks BLK1 to BLKz. Each memory block may have a three-dimensional structure. Each memory block may include a plurality of memory cells stacked on a substrate (not shown). The plurality of memory cells may be arranged along +X, +Y, and +Z directions. A structure of each memory block will be described in more detail with reference to FIG. 4.

Figure 4:
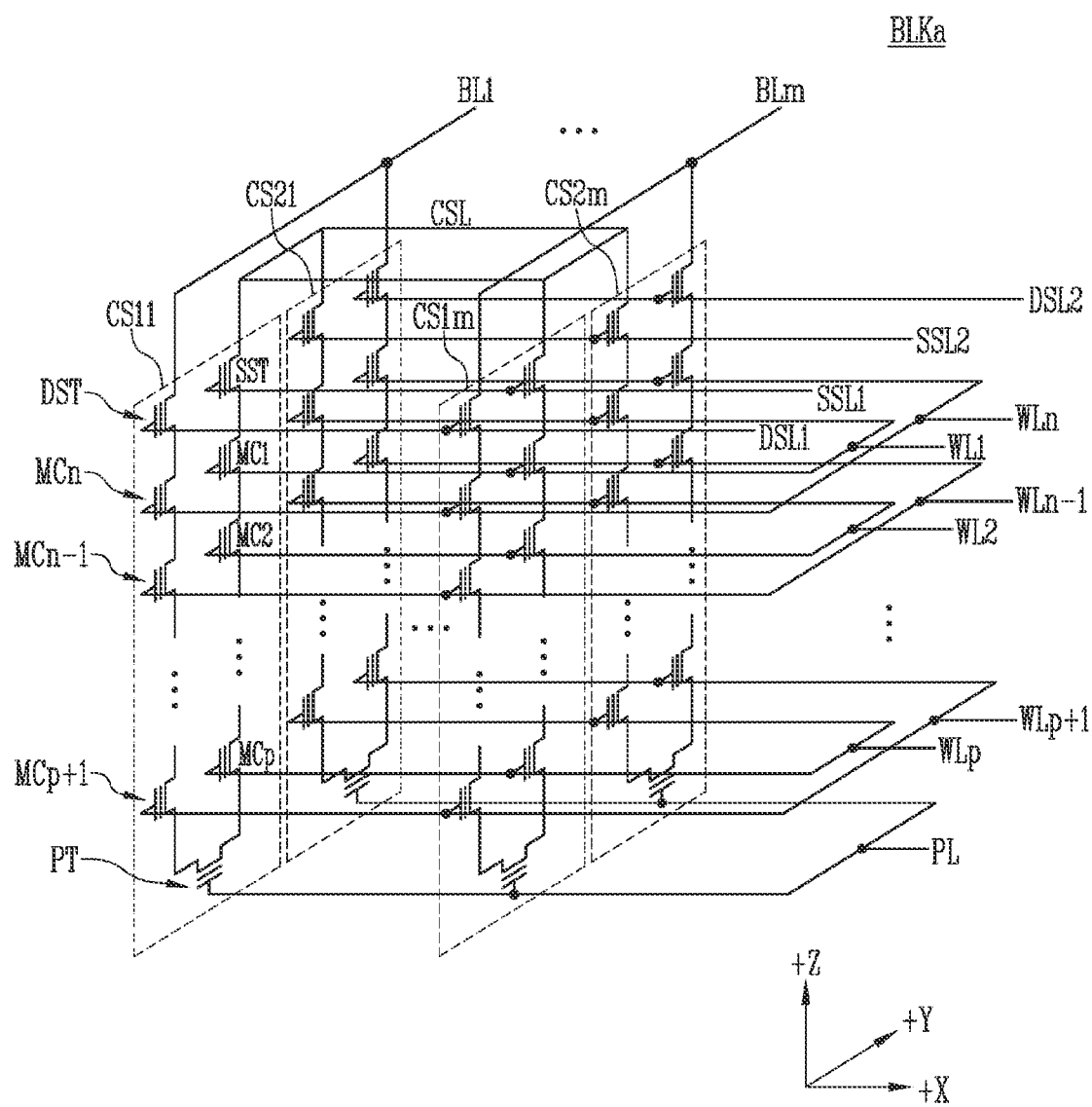
FIG. 4 is a circuit diagram illustrating a memory block among memory blocks shown in FIG. 2 in accordance with an embodiment of the present disclosure.

FIG. 4 is a circuit diagram illustrating a memory block BLKa among the memory blocks BLK1 to BLKz shown in FIG. 2 in accordance with an embodiment of the present disclosure.

Referring to FIG. 4, the memory block BLKa may include a plurality of cell strings CS11 to CS1*m* and CS21 to CS2*m*. In an embodiment, each of the plurality of cell strings CS11 to CS1*m* and CS21 to CS2*m* may be formed in a 'U' shape. In the memory block BLKa, m cell strings are arranged in a row direction (i.e., a +X direction). In FIG. 4, it is illustrated that two cell strings arranged in a column direction (i.e., a +Y direction). However, this is for convenience of description, and it will be understood that three cell strings may be arranged in the column direction.

Each of the plurality of cell strings CS11 to CS1*m* and CS21 to CS2*m* may include at least one source select transistor SST, first to nth memory cells MC1 to MCn, a pipe transistor PT, and at least one drain select transistor DST.

The select transistors SST and DST and the memory cells MC1 to MCn may have structures similar to one another. In an embodiment, each of the select transistors SST and DST and the memory cells MC1 to MCn may include a channel layer, a tunneling insulating layer, a charge storage layer, and a blocking insulating layer. In an embodiment, a pillar for providing the channel layer may be provided in each cell string. In an embodiment, a pillar for providing at least one of the channel layer, the tunneling insulating layer, the charge storage layer, and the blocking insulating layer may be provided in each cell string.

The source select transistor SST of each cell string is connected between a common source line CSL and memory cells MC1 to MCp.

In an embodiment, the source select transistors of cell strings arranged on the same row are connected to a source select line extending in the row direction, and the source select transistors of cell strings arranged on different rows are connected to different source select lines. In FIG. 4, the source select transistors of the cell strings CS11 to CS1*m* on a first row are connected to a first source select line SSL1. The source select transistors of the cell strings CS21 to CS2*m* on a second row are connected to a second source select line SSL2.

In another embodiment, the source select transistors of the cell strings CS11 to CS1*m* and CS21 to CS2*m* may be commonly connected to one source select line.

The first to nth memory cells MC1 to MCn of each cell string are connected between the source select transistor SST and the drain select transistor DST.

The first to nth memory cells MC1 to MCn may be divided into first to pth memory cells MC1 to MCp and a (p+1)th to nth memory cells MCp+1 to MCn. The first to pth memory cells MC1 to MCp are sequentially arranged in the opposite direction of a +Z direction, and are connected in series between the source select transistor SST and the pipe transistor PT. The (p+1)th to nth memory cells MCp+1 to MCn are sequentially arranged in the +Z direction, and are connected in series between the pipe transistor PT and the drain select transistor DST. The first to pth memory cells MC1 to MCp and the (p+1)th to nth memory cells MCp+1 to MCn are connected through the pipe transistor PT. Gate electrodes of the first to nth memory cells MC1 to MCn of each cell string are connected to first to nth word lines WL1 to WLn, respectively.

A gate of the pipe transistor PT of each cell string is connected to a pipe line PL.

The drain select transistor DST of each cell string is connected between a corresponding bit line and the memory cells MCp+1 to MCn. Cell strings arranged in the row direction are connected to a drain select line extending in the row direction. The drain select transistors of the cell strings CS11 to CS1*m* on the first row are connected to a first drain select line DSL1. The drain select transistors of the cell strings CS21 to CS2*m* on the second row are connected to a second drain select line DSL2.

Cell strings arranged in the column direction are connected to a bit line extending in the column direction. In FIG. 4, the cell strings CS11 and CS21 on a first column are connected to a first bit line BL1. The cell strings CS1*m* and CS2*m* on an mth column are connected to an mth bit line BLm.

Memory cells connected to the same word line in the cell strings arranged in the row direction constitute one page. For example, memory cells connected to the first word line WL1 in the cell strings CS11 to CS1*m* on the first row constitute one page. Memory cells connected to the first word line WL1 in the cell strings CS21 to CS2*m* on the second row constitute another page. As one of the drain select lines DSL1 and DSL2 is selected, cell strings arranged in one row direction may be selected. As one of the word lines WL1 to WLn is selected, one page may be selected in the selected cell strings.

Figure 5:
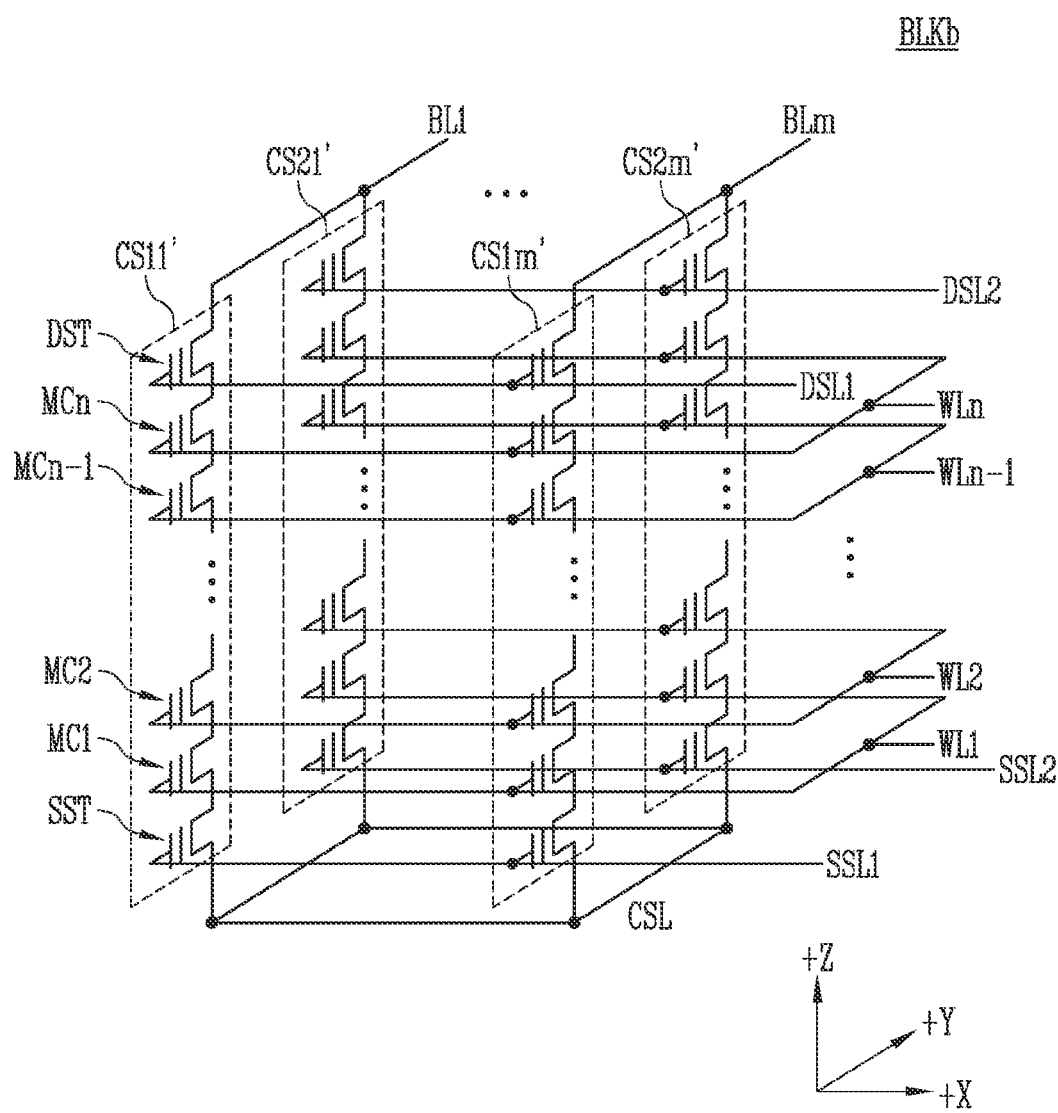
FIG. 5 is a circuit diagram illustrating a memory block among the memory blocks shown in FIG. 2. in accordance with another embodiment of the present disclosure

FIG. 5 is a circuit diagram illustrating memory block BLKb among the memory blocks BLK1 to BLKz shown in FIG. 2 in accordance with an embodiment of the present disclosure.

In another embodiment, even bit lines and odd bit lines may be provided instead of the first to mth bit lines BL1 to BLm. In addition, even-numbered cell strings among the cell strings CS11 to CS1*m* or CS21 to CS2*m* arranged in the row direction may be connected to the even bit lines, respectively, and odd-numbered cell strings among the cell strings CS11 to CS1*m* or CS21 to CS2*m* arranged in the row direction may be connected to the odd bit lines, respectively.

In an embodiment, at least one of the first to nth memory cells MC1 to MCn may be used as a dummy memory cell. For example, the at least one dummy memory cell may be provided to decrease an electric field between the source select transistor SST and the memory cells MC1 to MCp. Alternatively, the at least one dummy memory cell may be provided to decrease an electric field between the drain select transistor DST and the memory cells MCp+1 to MCn. When the number of dummy memory cells increases, the reliability of an operation of the memory block BLKb is improved. On the other hand, the size of the memory block BLKb increases. When the number of dummy memory cells decreases, the size of the memory block BLKb decreases. On the other hand, the reliability of an operation of the memory block BLKb may be deteriorated.

In order to efficiently control the at least one dummy memory cell, the dummy memory cells may have a required threshold voltage. Before or after an erase operation of the memory block BLKb, a program operation may be performed on all or some of the dummy memory cells. When an erase operation is performed after the program operation is performed, by controlling a voltage applied to the dummy word lines connected to the respective dummy memory cells, the dummy memory cells may have the required threshold voltage.

Figure 6:
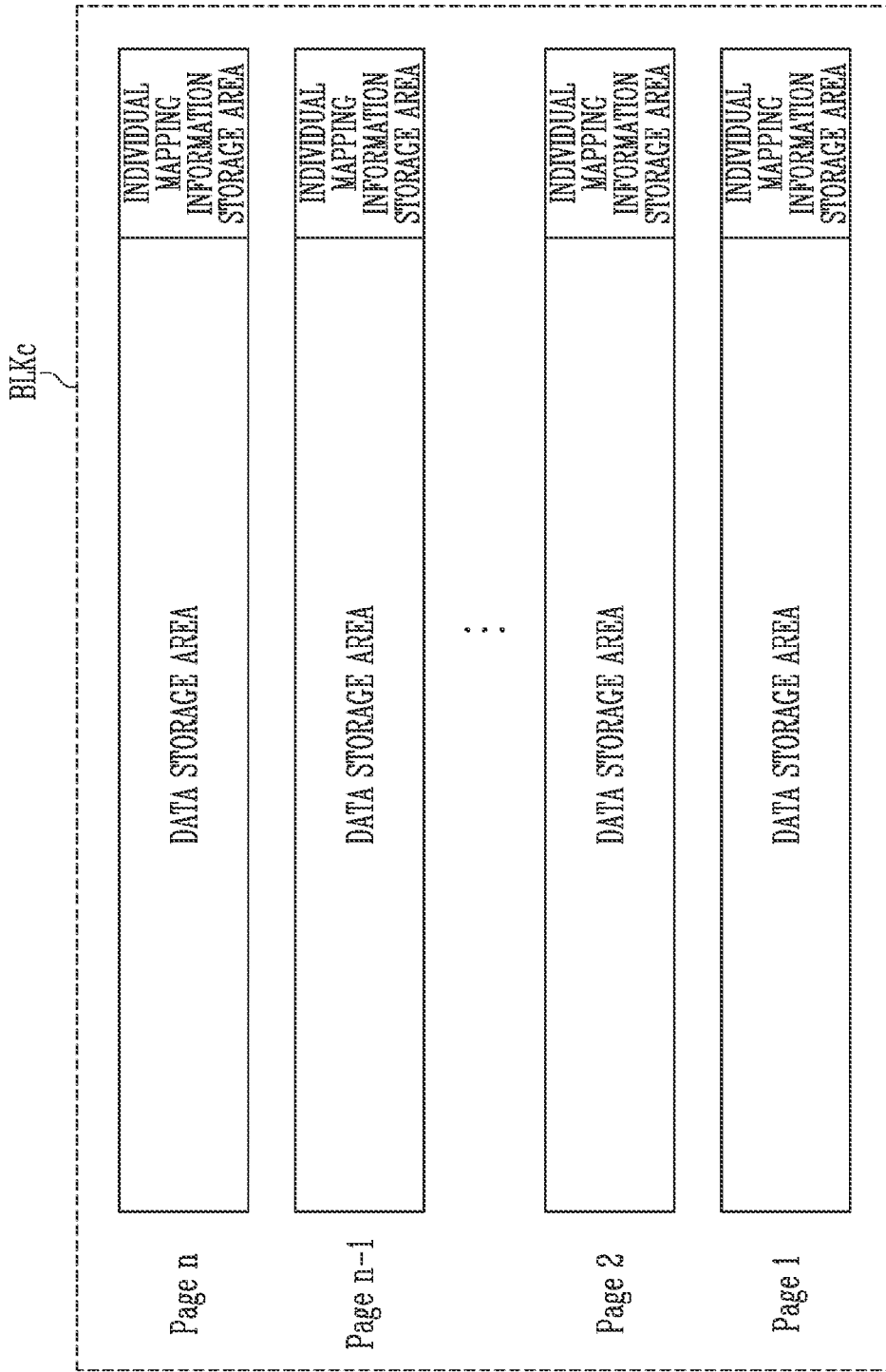
FIG. 6 is a diagram illustrating a state in which data is stored in a plurality of pages included in a memory block among the memory blocks shown in FIG. 2 in accordance with an embodiment of the present disclosure.

FIG. 6 is a diagram illustrating a state in which data is stored in a plurality of pages included in a memory block BLKc among the memory blocks BLK1 to BLKz shown in FIG. 2 in accordance with an embodiment of the present disclosure.

Referring to FIG. 6, the memory block BLKc may include a plurality of physical pages Page 1 to Page n. In the case of a single level cell (SLC) storing 1-bit data in one memory cell, one physical page may correspond to one page. In another example, in the case of a multi-level cell (MLC) storing 2 or more-bit data in one memory cell, one physical page may correspond to two or more pages. Each page may include a data storage area in which data input from the host is stored and an individual mapping information storage area in which individual mapping information on data stored in the corresponding page is stored. The memory controller may store data according to a request of the host in the data storage area, and store, in the individual mapping information storage area, individual mapping information corresponding to the page in which the data is stored.

For example, when a program command, data, and a logical address corresponding to the program command are input from the host, the memory controller may allocate a first page Page 1 of the memory block BLKc to store data. The memory controller may control the memory device to store, in the individual mapping information storage area, the individual mapping information representing a mapping relationship between the logical block address input from the host and a physical block address of the allocated first page Page 1. In an embodiment, a logical block address corresponding to the allocated physical block address may be stored in the individual mapping information storage area.

When the individual mapping information is stored in the memory block BLKc, mapping information stored in the mapping information storage in the memory controller can be recovered by using the individual mapping information stored in the memory block BLKc, even when the mapping information disappears from the mapping information storage in the memory controller since a sudden power off occurred in the storage device.

Figure 7:
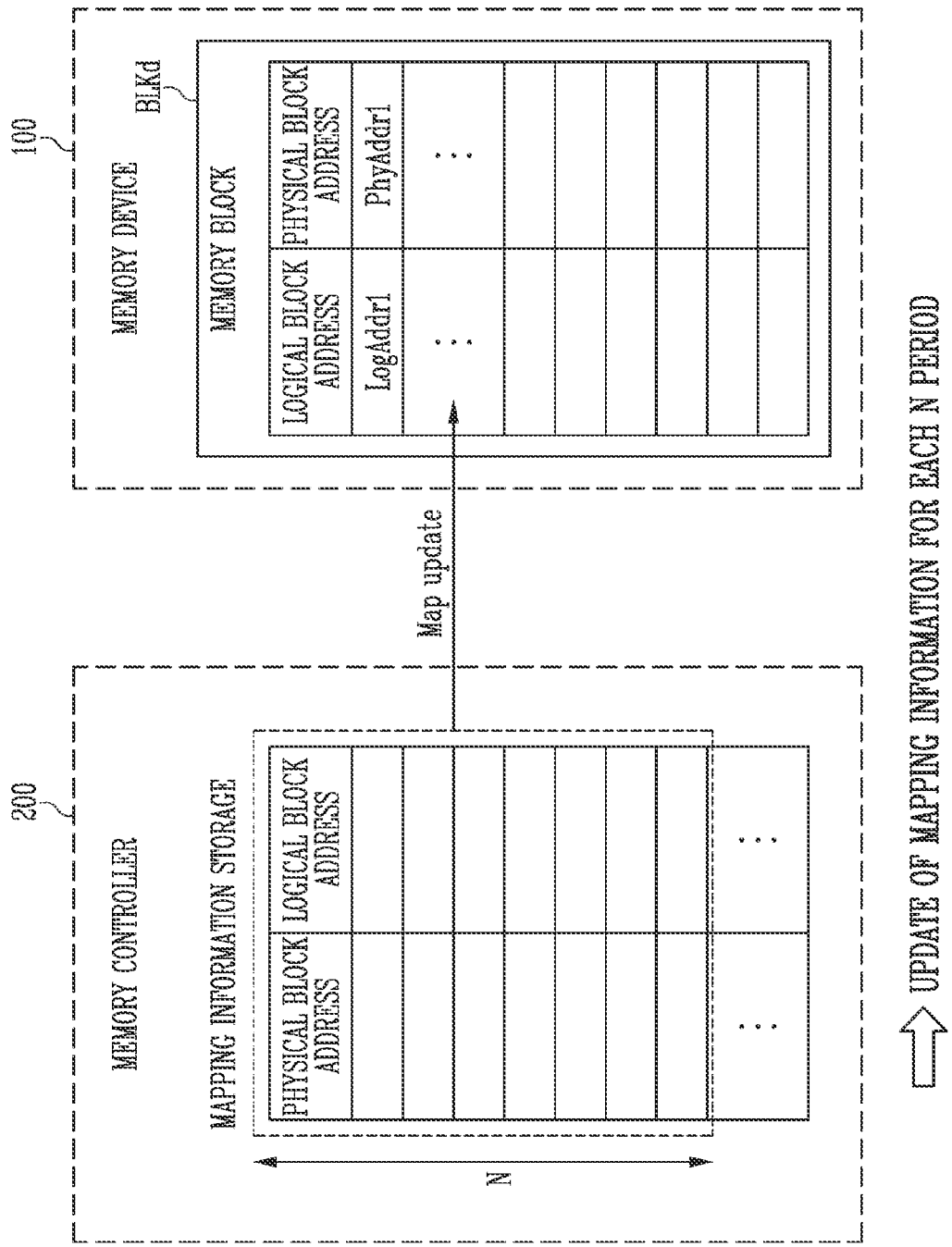
FIG. 7 is a diagram illustrating a state in which mapping information stored in the memory device is updated for each certain period in accordance with an embodiment of the present disclosure.

FIG. 7 is a diagram illustrating a state in which mapping information stored in the memory device is updated for each certain period in accordance with an embodiment of the present disclosure.

In some embodiments, the memory controller 200 may include mapping information storage which stores mapping information. The mapping information may include a logical block address received from the host and physical block address information corresponding to the logical block address. For example, when the memory controller 200 receives a program command, data, and a logical block address from the host, the memory controller 200 may allocate at least one page in a memory block, in which the data is to be stored. The memory controller 200 may store logical block address information corresponding to the allocated page and a physical block address information corresponding to the logical block address information in the mapping information storage in the memory controller 200. The memory controller 200 may perform a program operation of storing the data received from the host in a page corresponding to the allocated physical block address information in the memory device 200.

In an embodiment, the memory device 100 may include a memory block BLKd in which mapping information is stored. It may be necessary for the mapping information included in the memory block BLKd to be periodically updated. In an embodiment, after the memory controller 200 receives the program command from the host, the memory controller 200 may perform an operation of updating the mapping information stored in the memory block BLKd after a program operation corresponding to the N number of logical block addresses is completed. In an embodiment, the memory controller 200 may receive, from the memory device 100, a L2P map corresponding to a memory block on which a program operation according to a write request of the host is performed so as to perform the operation of updating the mapping information. The memory controller 200 may store the provided L2P map in the mapping information storage. The memory controller 200 may update the L2P map in the mapping information storage and then store the updated L2P map back into the memory block BLKd. After the operation of updating the L2P map is completed, the L2P map stored in the mapping information storage of the memory controller 200 may be deleted. In this disclosure, the map information stored in the mapping information storage 230 within the memory controller 200 or in the memory block BLKd within the memory device 100 may also be referred to as a logical-to-physical (L2P) map. In this disclosure, the individual mapping information stored in the individual mapping information storage area (see FIG. 6) may also be referred to as a physical-to-logical (P2L) map.

FIG. 8 is a diagram illustrating a program operation time according to a change in update period of mapping information and recovery cost when a Sudden Power Off (SPO) occurs in accordance with an embodiment of the present disclosure.

Referring to FIGS. 7 and 8, an input/output operation of data may be delayed while the memory controller 200 updates the L2P map in the memory block BLKd. Therefore, a memory operation performed by the memory controller 200 may be more rapidly performed as a period in which the operation of updating the L2P map is performed becomes longer. However, when the period in which the operation of updating the mapping information is performed becomes long, cost required to recover the L2P map stored in the mapping information storage 220 may increase when a SPO occurs in a memory system including the memory controller 200 and the memory device 100. That is, in an embodiment, when the period in which the L2P map stored in the memory block BLKd is updated is increased, the time required until the write operation according to the request of the host is completed may decrease, but the cost required to recover the L2P map included in the mapping information storage may increase when a SPO occurs. On the contrary, when the period in which the L2P map stored in the memory block BLKd is updated is decreased, the time required until the write operation according to the request of the host is completed may increase, but cost required to recover the L2P map included in the mapping information storage may decrease when the SPO occurs.

Figure 9:
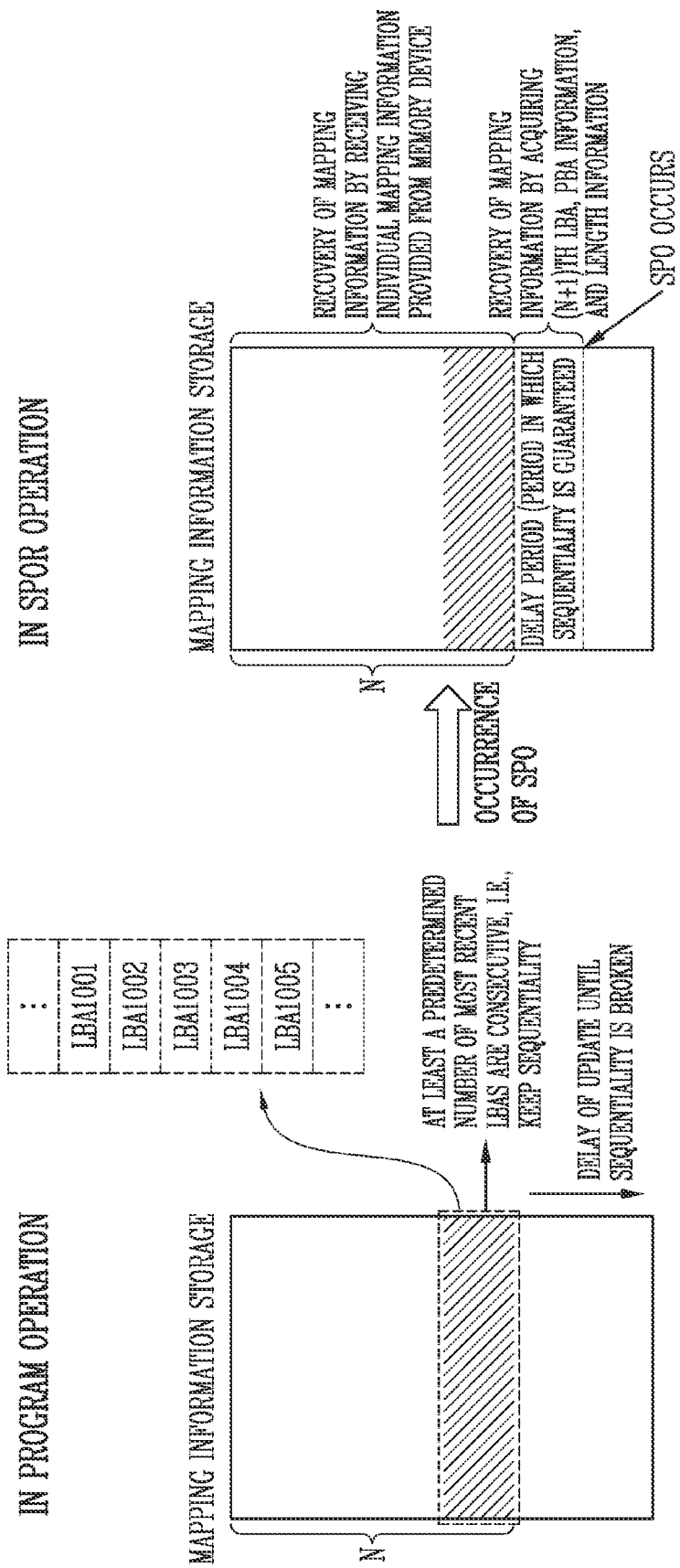
FIG. 9 is a diagram illustrating a program operation and a recovery method of mapping information in accordance with an embodiment of the present disclosure.

FIG. 9 is a diagram illustrating a program operation and a recovery method of mapping information in accordance with an embodiment of the present disclosure.

Referring to FIG. 9, the memory controller may control the memory device to perform a program operation of storing data according to a request of the host in response to a write request of the host. The memory controller may allocate logical block addresses provided from the host to a plurality of pages in a memory block, in which the data is to be stored. The memory controller may perform a program operation of storing the data provided from the host in the allocated pages.

When a program operation on N logical block addresses among a plurality of logical block addresses provided from the host is completed, the memory controller may perform an operation of updating the L2P map stored in the mapping information storage to a specific memory block (e.g., the memory block BLKd) in the memory device. In an embodiment, the memory controller may delay the operation of updating the L2P map when a predetermined number or more of most recent logical block addresses maintain sequentiality in the L2P map with respect to a time at which a program operation on data corresponding to the N logical block addresses is completed. When logical addresses (or logical block addresses) most recently added in the L2P map are consecutive at each period, the L2P map or the most recently added logical addresses maintain sequentiality at the period.

For example, when 5 or more logical block addresses most recently provided from the host maintain sequentiality, the memory controller may delay the operation of updating the L2P map. Specifically, the most recent logical block addresses provided from the host are LBA1001, LBA1002, LBA1003, LBA1004, and LBA1005, it may be determined that the logical block addresses are sequential. In an embodiment, since 5 or more most recent logical block addresses are sequential with respect to the time at which a program operation on data corresponding to the N logical block addresses is completed, the memory controller may delay the operation of updating the L2P map and continuously perform the program operation. The memory controller may delay the operation of updating the L2P map until a time at which the sequentiality of the logical block addresses is broken. That is, when the sequentiality of the logical block addresses is broken, the memory controller may suspend the program operation being performed and perform the operation of updating the L2P map. The memory controller may perform the operation of updating the L2P map even when data is stored in all pages included in the memory block on which the program operation is being performed.

Referring to FIG. 9, the operation of updating the L2P map may be delayed, and a SPO may occur while the memory controller performs the program operation. The mapping information storage may include a volatile memory. Therefore, when the SPO occurs, the L2P map stored in the mapping information storage may be deleted. When the SPO occurs, the memory controller may perform a Sudden Power Off Recovery (SPOR) operation. The SPOR operation may include an operation of recovering the L2P map, which was deleted from the mapping information storage due to the SPO.

In an embodiment, the memory controller may recover L2P map corresponding to the N logical block addresses, which represent data stored after an update operation is performed lastly before the SPO occurs, based on individual mapping information or the P2L map provided from the memory device. That is, referring to FIG. 6, the memory controller may perform a recovery operation by reading individual mapping information or the P2L map stored in the individual mapping information storage area of pages in which data corresponding to the N logical addresses are stored. N pages are all to be read for the P2L map corresponding to the N logical addresses representing the data stored after the most recent update operation before the SPO, and therefore, it may take a long time. In order to determine whether the operation of updating the mapping information or the L2P map has been delayed, the memory controller may read pages corresponding to (N+1) logical block addresses of the P2L map with respect to a time at which the update operation is performed lastly before the SPO occurs. The memory controller may determine that the operation of updating the mapping information or the L2P map is delayed when data is stored in a page corresponding to an (N+1)th logical block address of the P2L map. The delay of updating the L2P map may guarantee the sequentiality of the L2P map at the time point of starting the delay, and therefore there is high probability that the sequentiality can be kept still at the time point of the SPO while the update of the L2P map is being delayed. When the sequentiality is guaranteed, the L2P map for the data stored after the most recent update operation before the SPO may be recovered by using the P2L map of a page in which the data is stored first of all among pages in which the data is stored, and length information of the data. Therefore, in the case of mapping information of data stored in a delay section, the memory controller may acquire, from the memory device, logical block information and physical block information of (N+1) th data and length information of the data, thereby recovering the mapping information. The delay section may mean a period from a time at which the update operation is delayed to a time at which the SPO occurs. It is unnecessary to read all pages stored during the delay section, and a relatively short time may be taken.

Figure 10:
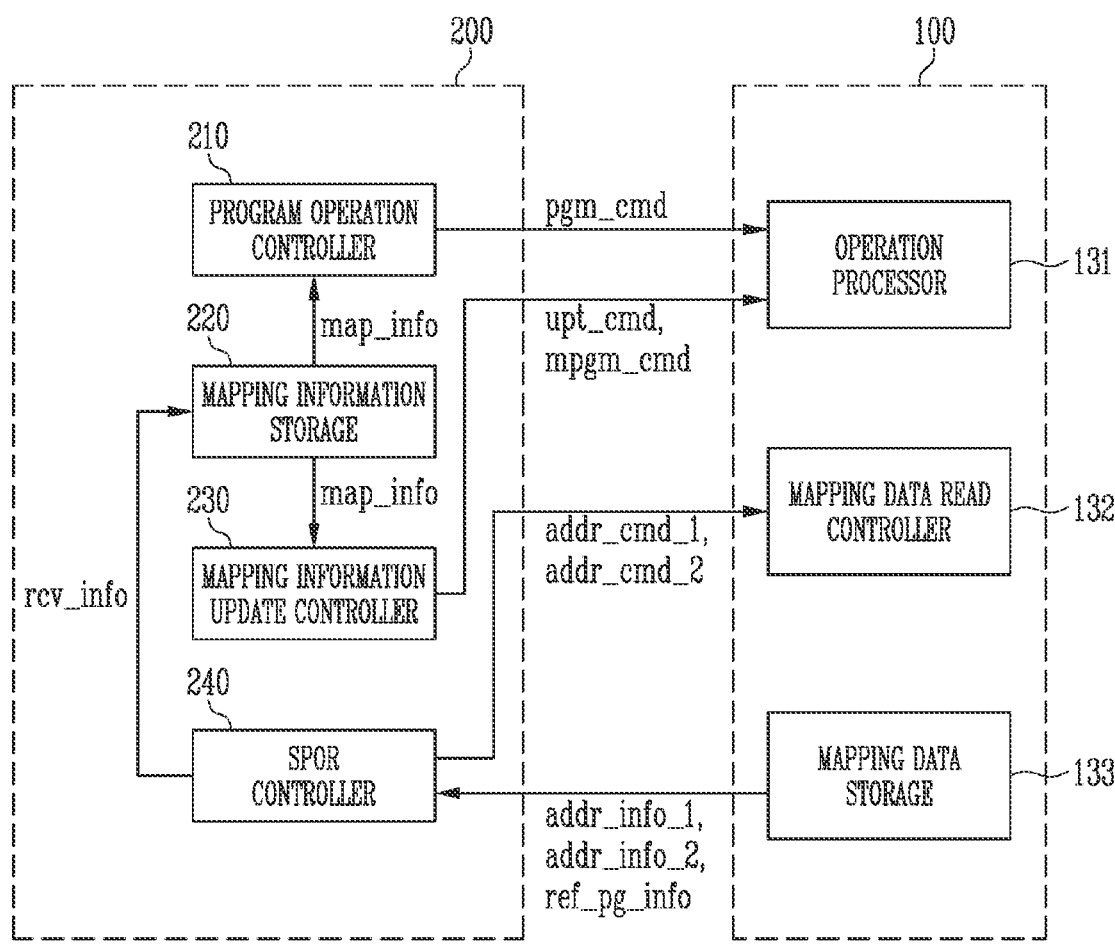
FIG. 10 is a block diagram illustrating configurations and operations of a memory controller and the memory device in accordance with an embodiment of the present disclosure.

FIG. 10 is a block diagram illustrating configurations and operations of the memory controller and the memory device in accordance with an embodiment of the present disclosure.

Referring to FIG. 10, the memory controller 200 may include a program operation controller 210, a mapping information storage 220, a mapping information update controller 230, and an SPOR controller 240. The memory device 100 may include an operation processor 131, a mapping data read controller 132, and a mapping data storage 133.

The mapping information storage 220 may store mapping information map_info or the L2P map as information on logical addresses and physical addresses corresponding to the logical addresses. The mapping information storage 220 may provide the mapping information map_info or the L2P map to the program operation controller 210 and the mapping information update controller 230.

The program operation controller 210 may provide the operation processor 131 of the memory device 100 with a program command pgm_cmd for storing, into a page in a first memory block included in the memory device 100, data according to a request of the host and individual mapping information or the P2L map as logical block address information corresponding to a physical block address of the page.

The operation processor 131 may store data and mapping information or the P2L map in the first memory block, corresponding to the program command pgm_cmd.

The mapping information update controller 230 may provide the operation processor 131 with a mapping information storage command mpgm_cmd for storing, in a second memory block included in the memory device 100, the mapping information map_info or the L2P map provided from the mapping information storage 220. The operation processor 131 may perform an operation of storing the mapping information map_info or the L2P map in the second memory block included in the memory device 100 in response to the mapping information storage command mpgm_cmd. The mapping information update controller 230 may provide the operation processor 131 with a mapping information update command upt_cmd for updating mapping information or the L2P map stored in the second memory block for each predetermined time. The operation processor 131 may perform an operation of updating the mapping information or the L2P map stored in the second memory block in response to the mapping information update command upt_cmd. The predetermined time may mean a time at which a program operation corresponding to the N number of logical block addresses is completed (see FIG. 7). In an embodiment, when a predetermined number or more of logical block addresses maintain sequentiality with respect to the predetermined time, the mapping information update controller 230 may delay the operation of updating the mapping information or the L2P map until the sequentiality is broken.

When a sudden power off occurs while data is stored in the first memory block during the delay of updating the L2P map, the SPOR controller 240 may perform an operation of receiving individual mapping information or the P2L map provided from the memory device 100 to recover the mapping information or the L2P map stored in the mapping information storage 220. The SPOR controller 240 may provide the mapping data read controller 132 with a first address read command addr_cmd_1 for allowing the mapping data read controller 132 to perform an operation reading individual mapping information or the P2L map from the first memory block. The mapping data read controller 132 may control the peripheral circuit to read the individual mapping information or the P2L map from the first memory block in response to the first address read command addr_cmd_1. The read individual mapping information or the read P2L map may be stored in the mapping data storage 133. The mapping data storage 133 may provide the individual mapping information addr_info_1 or the P2L map to the SPOR controller 240.

The SPOR controller 240 may acquire, from the mapping data storage 133 of the memory device 100, physical block address information ref_pg_info of a reference page as the page of the data stored in the first memory block at a time at which the mapping information is lastly updated before the SPO occurs, and then read a (default number+1)th page from the reference page. When data exists in the (default number+1)th page, the SPOR controller 240 may determine that the operation of updating the mapping information is delayed. For example, the default number may be N. The SPOR controller 240 may acquire, through the first address read command addr_cmd_1, the P2L map corresponding to the data stored in the N number of pages from the reference page.

When a SPO occurs after the operation of updating the mapping information is delayed, the SPOR controller 240 may provide a second address read command addr_cmd_2 to the mapping data read controller 132. The second address read command addr_cmd_2 may be a command for requesting logical block address information and physical block address information of data stored at the time at which the operation of updating the mapping information is delayed and logical block address information of data lastly stored before the SPO occurs.

The mapping data read controller 132 may control the peripheral circuit to perform an operation of reading mapping information requested by the SPOR controller 240 from the second memory block in response to the second address read command addr_cmd_2.

The mapping data read controller 132 may control the peripheral circuit to search for a target page in which the data lastly stored before the SPO occurs is stored by using a binary search method. The mapping data read controller 132 may control the peripheral circuit to acquire a logical block address from the P2L map corresponding to the data lastly stored before the SPO occurs by reading the individual mapping information storage area (see FIG. 6) included in the searched target page.

The read mapping information i.e., the logical address from the P2L map may be stored in the mapping data storage 133. The mapping data storage 133 may provide the SPOR controller 240 with the logical address information and the physical address information i.e., the P2L map corresponding to the data stored at the time at which the operation of updating the mapping information is delayed and the logical address addr_info_2 i.e., the logical address from the P2L map corresponding to the data lastly stored before the SPO occurs. The SPOR controller 240 may acquire, through the second address read command addr_cmd_2, the P2L map corresponding to the data stored when the delay of update starts and the logical address from the P2L map corresponding to the data most recently stored at the time of the SPO. Therefore, the SPOR controller 240 may acquire, through the first and second address read commands addr_cmd_1 and addr_cmd_2, the P2L map corresponding to the data stored in the (N+1) number of pages from the reference page and information on a length of data stored during the delay section. Here, the data stored in the (N+1) number of pages from the reference page may be the data stored after the most recent update of the L2P map until the delay of the update starts.

Based on the acquired P2L map information, the SPOR controller 240 may recover mapping information i.e., the L2P map corresponding to the data stored in the first memory block after the most recent update of the L2P map until the delay of the update starts and during a delay section from the time at which the operation of updating the mapping information is delayed to the time at which the SPO occurs, and then provide the recovered mapping information rev_info i.e., the recovered L2P map to the mapping information storage 220. The recovered mapping information i.e., the recovered L2P map may include information on logical addresses and corresponding physical addresses corresponding to the data stored in the first memory block after the most recent update of the L2P map until the delay of the update starts and during a delay section from when the delay of the update starts to when the SPO occurs. The recovered mapping information or the recovered L2P map, i.e., the L2P map having at least a number of most recent logical addresses, which are consecutive, at the period (i.e., the L2P map maintaining the sequentiality at the period) may be represented by logical and physical addresses corresponding to the data stored when the delay of the update starts and length information of the data stored during the delay section.

The SPOR controller 240 may acquire the length information of the data stored in the first memory block in the delay section by deriving an interval between a logical block address of data stored in the first memory block at the time at which the operation of updating the mapping information is delayed and a logical block address of data lastly stored in the first memory block before the SPO occurs.

Figure 11:
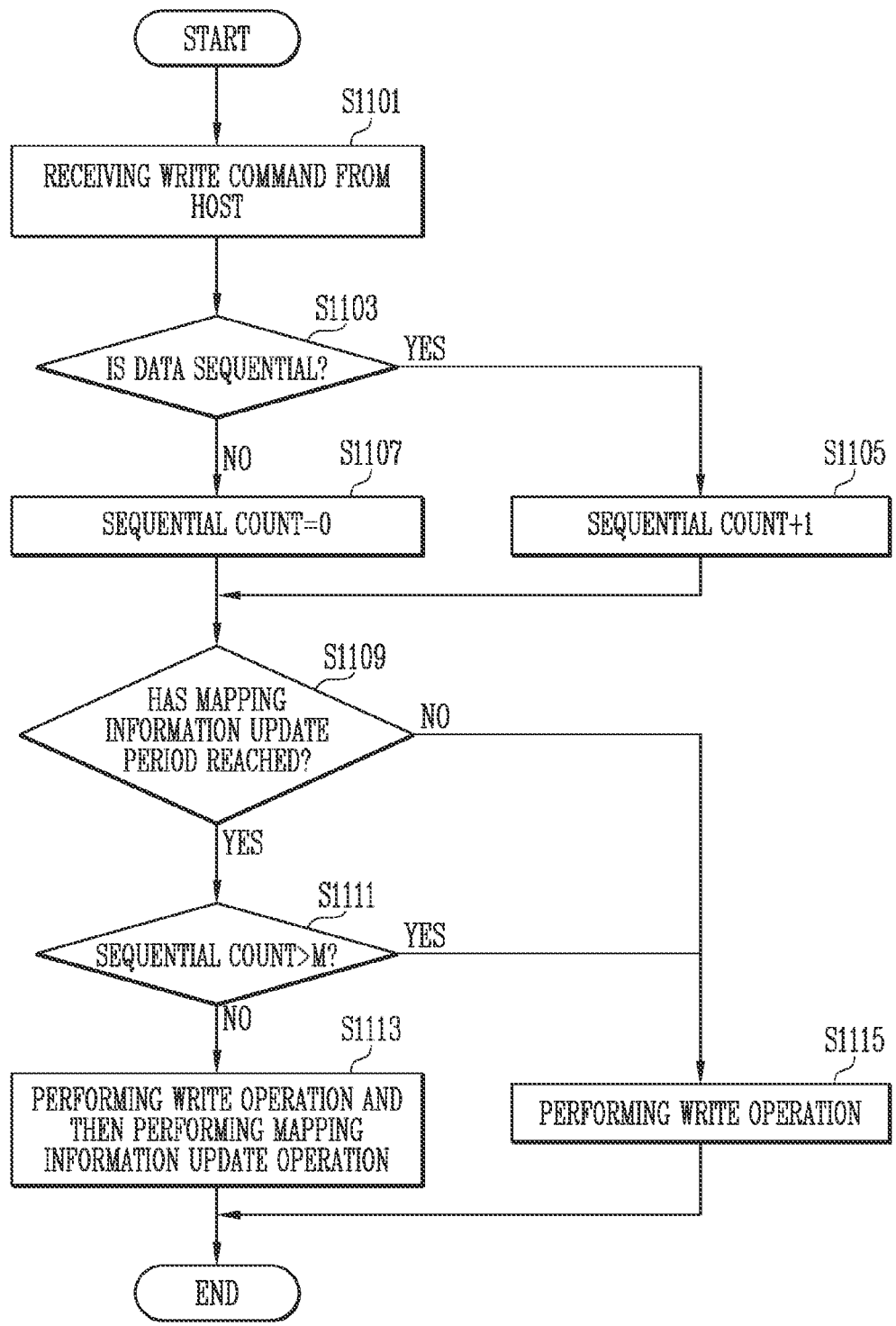
FIG. 11 is a flowchart illustrating a data write operation which the storage device performs according to a request of a host in accordance with an embodiment of the present disclosure.

FIG. 11 is a flowchart illustrating a data write operation which the storage device performs according to a request of the host in accordance with an embodiment of the present disclosure.

In S1101, the storage device may receive a write command from the host. The write request of the host may include data corresponding to the write request of the host and a logical block address at which the data is stored. The storage device may perform an operation of storing the data provided by the host at a physical block address corresponding to the logical block address specified by the host.

In S1103, the storage device may determine whether the data according to the write request of the host is sequential. For example, the storage device may determine whether the logical block address of the data according to the write request of the host is sequential by comparing the logical block address of the data according to the write request of the host with a logical block address previously stored data. That is, as described with reference to FIG. 9, when the logical block address of the data according to the write request of the host is LBA1002 and the logical block address of the previously stored data is LBA1001, the storage device may determine that the data according to the write request of the host is sequential.

In S1105, when it is determined that the data according to the write request of the host is sequential, the storage device may increase a sequential count by 1. The sequential count may mean a number of times the sequentiality of the data according to the write request of the host is maintained. For example, when the sequential count is 3, the sequentiality of 3 data may be maintained. An initial value of the sequential count may be 0. In S1107, when it is determined that the sequentiality of the data according to the write request of the host does not exist, the sequential count may be reset to 0.

In S1109, the storage device may determine whether a mapping information update period has reached. When the mapping information update period is not reached ('NO' at step S1109), the storage device may perform a write operation according to the write request of the host without updating the L2P map (S1115). Here, the mapping information update period may be the previously described predetermined time. As described above, the update of mapping information for each predetermined time, i.e., the periodical update of mapping information may mean that the mapping information is updated whenever the N number of logical-to-physical (L2P) map entries are generated for the mapping information. As described above, the periodicity may be related to a number of logical addresses.

When the mapping information update period has reached ('YES' at step S1109), in S1111, the storage device may determine whether the sequential count is equal to or greater than a predetermined value M. Here, the predetermined value M may be the predetermined number of the most recent logical address that maintain the sequentiality in the L2P map with respect to a time at which a program operation on data corresponding to the N logical addresses is completed, i.e., at each period. As described above, when logical addresses most recently added in the L2P map are consecutive at each period, the L2P map or the most recently added logical addresses maintain sequentiality at the period. FIG. 9 illustrates '5' as the predetermined value M. When the sequential count is equal to or greater than the predetermined value M, the storage device may perform the write operation according to the write request of the host without updating the L2P map (S1115). That is, when the sequential count is equal to or greater than the predetermined value M, the storage device may delay the mapping information (i.e., L2P map) update operation.

In S1113, when the sequential count is less than the predetermined value M, i.e., when the sequentiality of the logical addresses is broken or is not yet developed, the storage device may perform the write operation according to the write request of the host and then perform the mapping information update operation.

Figure 12B:
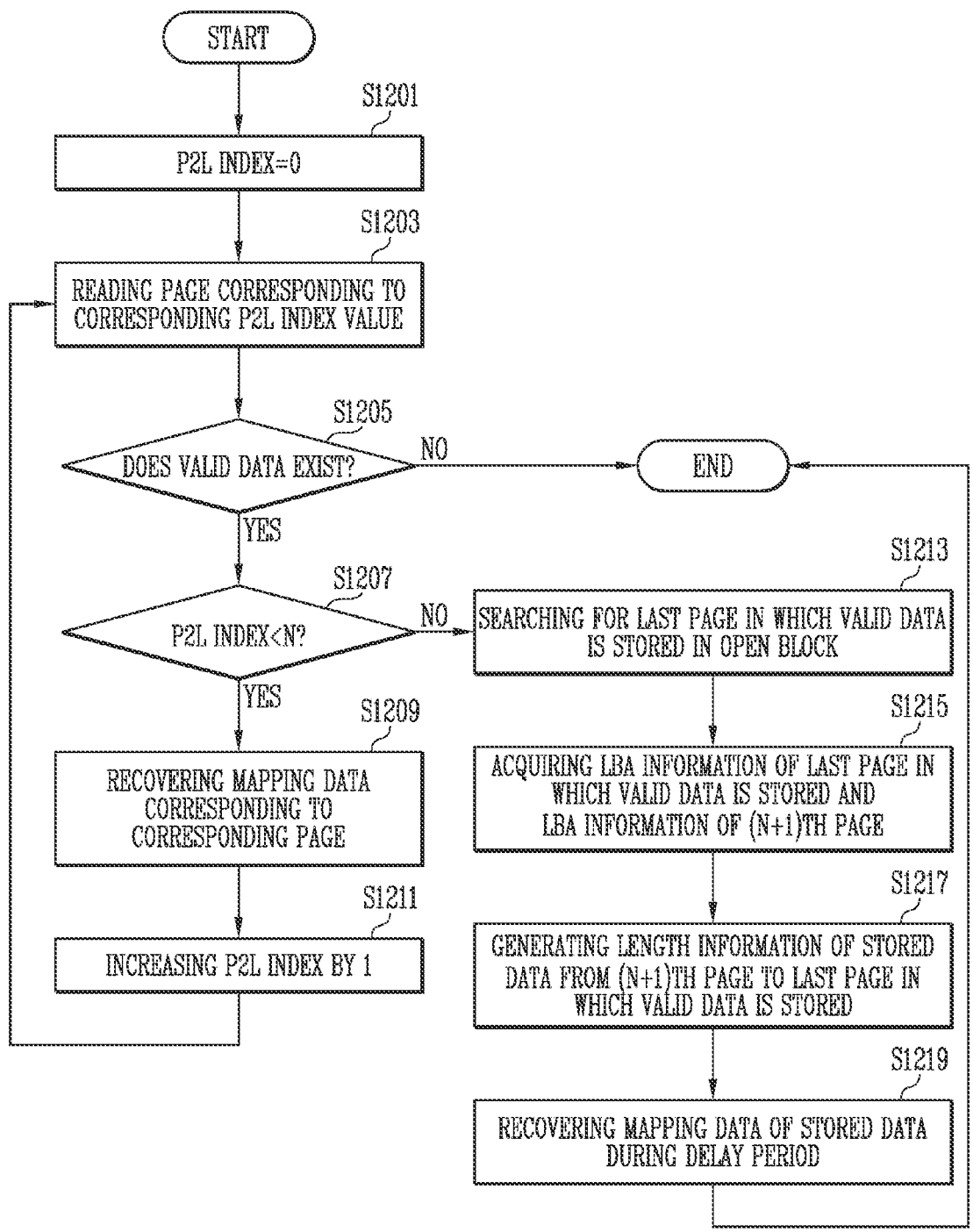

FIGS. 12A and 12B are diagrams illustrating an SPOR operation which the storage device performs when SPO occurs while the storage device stores data according to a request of the host in accordance with an embodiment of the present disclosure.

Referring to FIG. 12A, in an embodiment, when a SPO occurs during a write operation on a specific open block, the storage device may generate a P2L table to perform an SPOR operation on the corresponding open block. The P2L table may include physical bock address information from the P2L maps respectively corresponding to a plurality of pages included in an open block to be recovered. Physical block addresses from the P2L maps may be sorted with P2L index values. The storage device may recover logical block address information corresponding to each physical block address by acquiring individual mapping information or the P2L map included in each page of the open block. In an embodiment, a recovery operation for mapping information may be sequentially performed from a physical block address of which P2L index value is 0.

Referring to FIG. 12B, in S1201, the storage device may set an initial value of a P2L index to 0.

In S1203, the storage device may read a page corresponding to a P2L index value.

In S1205, the storage device may determine whether valid data exists in the read page. When any valid data does not exist in the read page as a read result, the SPOR operation may be ended.

When valid data exists in the read page, in S1207, the storage device may determine whether the P2L index value is equal to or less than N as a predetermined value. N may mean a period in which the storage device updates the mapping information as described with reference to FIGS. 7 to 9.

When the P2L index value is equal to or less than N, in S1209, the storage device may recover mapping data or the L2P map corresponding to the corresponding page. The storage device may recover the mapping data or the L2P map by acquiring individual mapping information or the P2L map from an individual mapping information storage area of the corresponding page.

In S1211, the storage device may go back to operation S1203 by increasing the P2L index by 1.

In an embodiment, after the memory controller 200 receives a program command from the host, the memory controller 200 may perform an operation of updating mapping information or the L2P map stored in the memory block BLKd after a program operation corresponding to N logical block addresses is completed.

In S1207, when the P2L index value is greater than N, the storage device may perform an operation of recovering mapping information or the L2P map corresponding to data stored in the open block during the delay section described in FIG. 9.

Specifically, in S1213, the storage device may search for a last page in which valid data is stored in the open block.

In S1215, the storage device may acquire logical address information from the P2L map corresponding to the last page in which the valid data is stored and logical address information from the P2L map corresponding to an (N+1)th page.

In S1217, based on the logical address information acquired at operation S1215, the storage device may generate length information of the data stored in the last page in which the valid data is stored from the (N+1)th page, as described with reference to the SPOR controller 240 of FIG. 10.

In S1219, the storage device may recover the mapping information or the L2P map corresponding to the stored data during the delay section by using logical block address information and physical block address information of (N+1)th data and the length information of the data stored in the last page in which the valid data is stored from the (N+1)th page, as described with reference to the SPOR controller 240 of FIG. 10.

Figure 13:
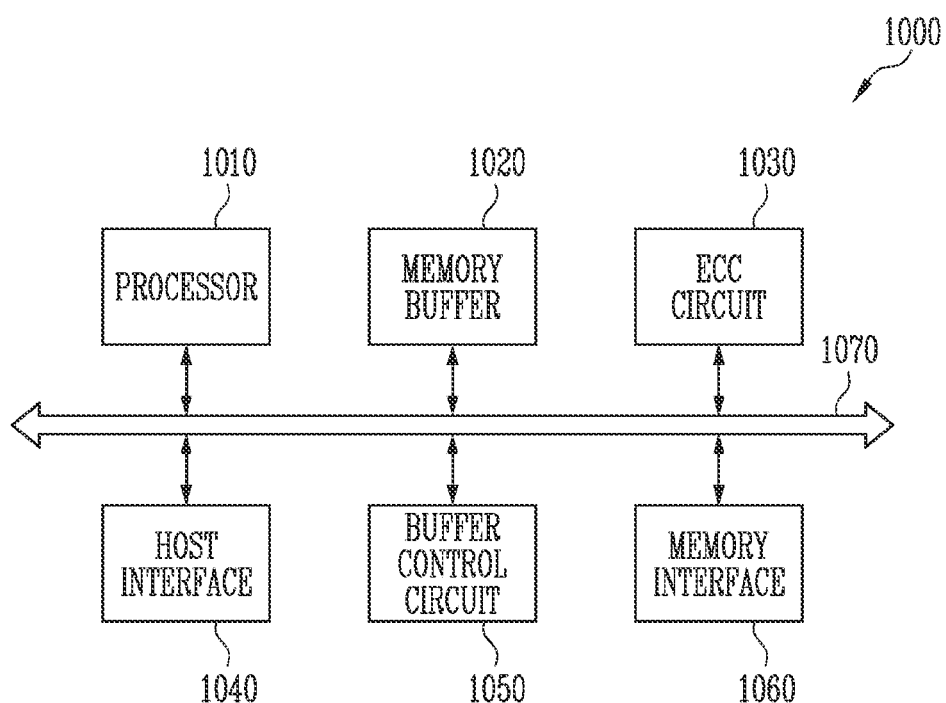
FIG. 13 is a diagram illustrating the memory controller shown in FIG. 1 in accordance with another embodiment of the present disclosure.

FIG. 13 is a diagram illustrating the memory controller shown in FIG. 1 in accordance with another embodiment of the present disclosure.

Referring to FIG. 13, a memory controller 1000 is connected to a host and a memory device. The memory controller 1000 may access the memory device in response to a request received from the host. For example, the memory controller 1000 may control write, read, erase, and background operations of the memory device. The memory controller 1000 may provide an interface between the memory device and the host. The memory controller 1000 may drive firmware for controlling the memory device.

The memory controller 1000 may include a processor 1010, a memory buffer 1020, an error correction code (ECC) circuit 1030, a host interface 1040, a buffer control circuit 1050, a memory interface 1060, and a bus 1070.

The bus 1070 may be configured to provide channels between components of the memory controller 1000.

The processor 1010 may control overall operations of the memory controller 1000, and perform a logical operation. The processor 1010 may communicate with the external host through the host interface 1040, and communicate with the memory device through the memory interface 1060. Also, the processor 1010 may communicate with the memory buffer 1020 through the buffer control circuit 1050. The processor 1010 may control an operation of the storage device, using the memory buffer 1020 as a working memory, a cache memory or a buffer memory.

The processor 1010 may perform a function of a flash translation layer (FTL). The processor 1010 may translate a logical block address (LBA) provided by the host through the FTL into a physical block address (PBA). The FTL may receive an LBA, using a mapping table, to translate the LBA into a PBA. Several address mapping methods of the FTL exist according to mapping units. A representative address mapping method includes a page mapping method, a block mapping method, and a hybrid mapping method.

The processor 1010 may randomize data received from the host. For example, the processor 1010 may randomize data received from the host, using a randomizing seed. The randomized data is provided as data to be stored to the memory device to be programmed in the memory cell array.

In a read operation, the processor 1010 may derandomize data received from the memory device. For example, the processor 1010 may derandomize data received from the memory device, using a derandomizing seed. The derandomized data may be output to the host.

In an embodiment, the processor 1010 may perform randomizing and derandomizing by driving software or firmware.

The memory buffer 1020 may be used as the working memory, the cache memory, or the buffer memory of the processor 1010. The memory buffer 1020 may store codes and commands, which are executed by the processor 1010. The memory buffer 1020 may include a Static RAM (SRAM) or a Dynamic RAM (DRAM).

The ECC circuit 1030 may perform an ECC operation. The ECC circuit 1030 may perform ECC encoding on data to be written in the memory device through the memory interface 1060. The ECC encoded data may be transferred to the memory device through the memory interface 1060. The ECC circuit 1030 may perform ECC decoding on data received from the memory device through the memory interface 1060. In an example, the ECC circuit 1030 may be included as a component of the memory interface 1060 in the memory interface 1060.

The host interface 1040 may communicate with the external host under the control of the processor 1010. The host interface 1040 may communicate with the host, using at least one of various communication standards or interfaces, such as a Universal Serial bus (USB), a Serial AT Attachment (SATA), a High Speed InterChip (HSIC), a Small Computer System Interface (SCSI), Firewire, a Peripheral Component Interconnection (PCI), a PCI express (PCIe), a NonVolatile Memory Express (NVMe), a Universal Flash Storage (UFS), a Secure Digital (SD), a Multi-Media Card (MMC), an embedded MMC (eMMC), a Dual In-line Memory Module (DIMM), a Registered DIMM (RDIMM), and a Load Reduced DIMM (LRDIMM).

The buffer control circuit 1050 is configured to control the memory buffer 1020 under the control of the processor 1010.

The memory interface 1060 is configured to communicate with the memory device under the control of the processor 1010. The memory interface 1060 may communicate a command, an address, and data with the memory device through a channel.

The memory controller 1000 may not include the memory buffer 1020 and the buffer control circuit 1050.

The processor 1010 may control an operation of the memory controller 1000 by using codes. The processor 1010 may load codes from a nonvolatile memory device (e.g., a read only memory (ROM)) provided in the memory controller 1000. In another example, the processor 1010 may load codes from the memory device through the memory interface 1060.

The bus 1070 of the memory controller 1000 may be divided into a control bus and a data bus. The data bus may be configured to transmit data in the memory controller 1000, and the control bus may be configured to transmit control information such as a command and an address in the memory controller 1000. The data bus and the control bus are separated from each other, and may not interfere or influence with each other. The data bus may be connected to the host interface 1040, the buffer control circuit 1050, the ECC circuit 1030, and the memory interface 1060. The control bus may be connected to the host interface 1040, the processor 1010, the buffer control circuit 1050, the memory buffer 1020, and the memory interface 1060.

Figure 14:
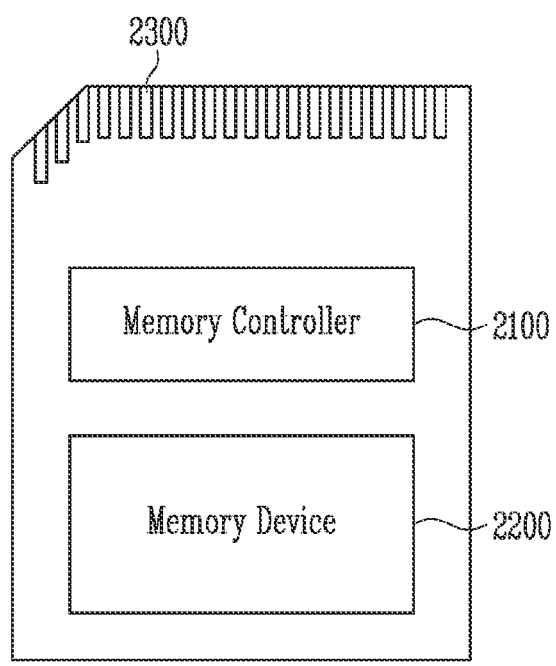
FIG. 14 is a block diagram illustrating a memory card system to which the storage device is applied in accordance with an embodiment of the present disclosure.

FIG. 14 is a block diagram illustrating a memory card system to which the storage device is applied in accordance with an embodiment of the present disclosure.

Referring to FIG. 14, the memory card system 2000 includes a memory controller 2100, a memory device 2200, and a connector 2300.

The memory controller 2100 is connected to the memory device 2200. The memory controller 2100 is configured to access the memory device 2200. For example, the memory controller 2100 is configured to control read, write, erase, and background operations of the memory device 2200. The memory controller 2100 is configured to provide an interface between the memory device 2200 and a host. The memory controller 2100 is configured to drive firmware for controlling the memory device 2200. The memory controller 2100 may be implemented identically to the memory controller 200 described with reference to FIG. 1.

The memory controller 2100 may include components such as a Random Access Memory (RAM), a processing unit, a host interface, a memory interface, and the error corrector 233.

The memory controller 2100 may communicate with an external device through the connector 2300. The memory controller 2100 may communicate with the external device (e.g., the host) according to a specific communication protocol. The memory controller 2100 may communicate with the external device through at least one of various communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), firewire, a Universal Flash Storage (UFS), Wi-Fi, Bluetooth, and NVMe.

The memory device 2200 may be implemented with various nonvolatile memory devices such as an Electrically Erasable and Programmable ROM (EEPROM), a NAND flash memory, a NOR flash memory, a Phase-change RAM (PRAM), a Resistive RAM (ReRAM), a Ferroelectric RAM (FRAM), and a Spin Torque Transfer magnetic RAM (STT-MRAM).

The memory controller 2100 and the memory device 2200 may be integrated into a single semiconductor device, to constitute a memory card. For example, the memory controller 2100 and the memory device 2200 may constitute a memory card such as a PC card (Personal Computer Memory Card International Association (PCMCIA)), a Compact Flash (CF) card, a Smart Media Card (SM and SMC), a memory stick, a Multi-Media Card (MMC, RS-MMC, MMCmicro and eMMC), an SD card (SD, miniSD, microSD and SDHC), and a Universal Flash Storage (UFS).

Figure 15:
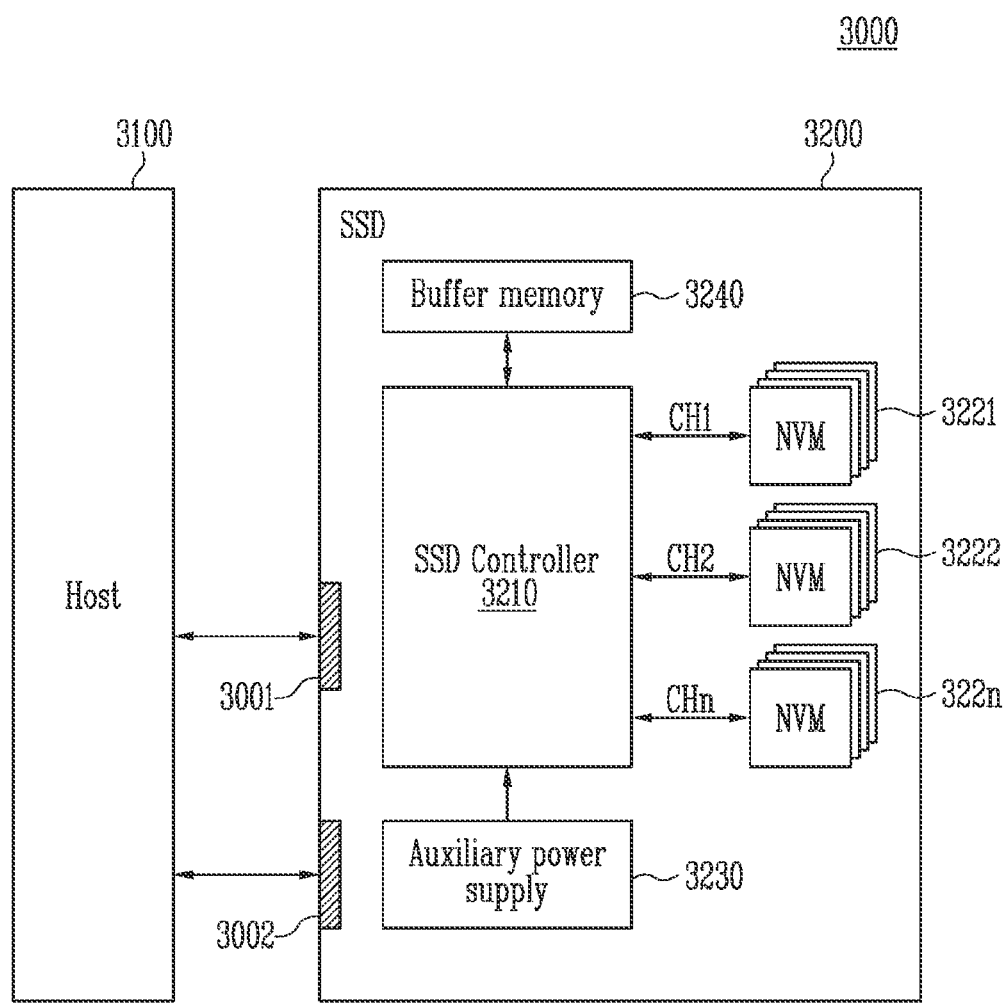
FIG. 15 is a block diagram illustrating a Solid State Drive (SDD) to which the storage device is applied in accordance with an embodiment of the present disclosure.

FIG. 15 is a block diagram illustrating a Solid State Drive (SDD) to which the storage device is applied in accordance with an embodiment of the present disclosure.

Referring to FIG. 15, the SSD system 3000 includes a host 3100 and an SSD 3200. The SSD 3200 exchanges a signal with the host 3100 through a signal connector 3001, and receives power through a power connector 3002. The SSD 3200 includes an SSD controller 3210, a plurality of flash memories 3221 to 322n, an auxiliary power supply 3230, and a buffer memory 3240.

In accordance with an embodiment of the present disclosure, the SSD controller 3210 may serve as the memory controller 200 described with reference to FIG. 1.

The SSD controller 3210 may control the plurality of flash memories 3221 to 322n in response to a signal received from the host 3100. The signal may be a signal based on an interface between the host 3100 and the SSD 3200. For example, the signal may be a signal defined by at least one of communication standards or interfaces such as a Universal Serial Bus (USB), a Multi-Media Card (MMC), an embedded MMC (eMMC), a Peripheral Component Interconnection (PCI), a PCI express (PCIe), an Advanced Technology Attachment (ATA), a Serial-ATA (SATA), a Parallel-ATA (PATA), a Small Computer System Interface (SCSI), an Enhanced Small Disk Interface (ESDI), an Integrated Drive Electronics (IDE), a firewire, a Universal Flash Storage (UFS), a WI-FI, a Bluetooth, and an NVMe.

The auxiliary power supply 3230 is connected to the host 3100 through the power connector 3002. When the supply of power from the host 3100 is not smooth, the auxiliary power supply 3230 may provide power to the SSD 3200. The auxiliary power supply 3230 may be located in the SSD 3200, or be located at the outside of the SSD 3200. For example, the auxiliary power supply 3230 may be located on a main board, and provide auxiliary power to the SSD 3200.

The buffer memory 3240 operates as a buffer memory of the SSD 3200. For example, the buffer memory 3240 may temporarily store data received from the host 3100 or data received from the plurality of flash memories 3221 to 322n, or temporarily store meta data (e.g., a mapping table) of the flash memories 3221 to 322n. The buffer memory 3240 may include volatile memories such as a DRAM, an SDRAM, a DDR SDRAM, an LPDDR SDRAM, and a GRAM or nonvolatile memories such as a FRAM, a ReRAM, an STT-MRAM, and a PRAM.

Figure 16:
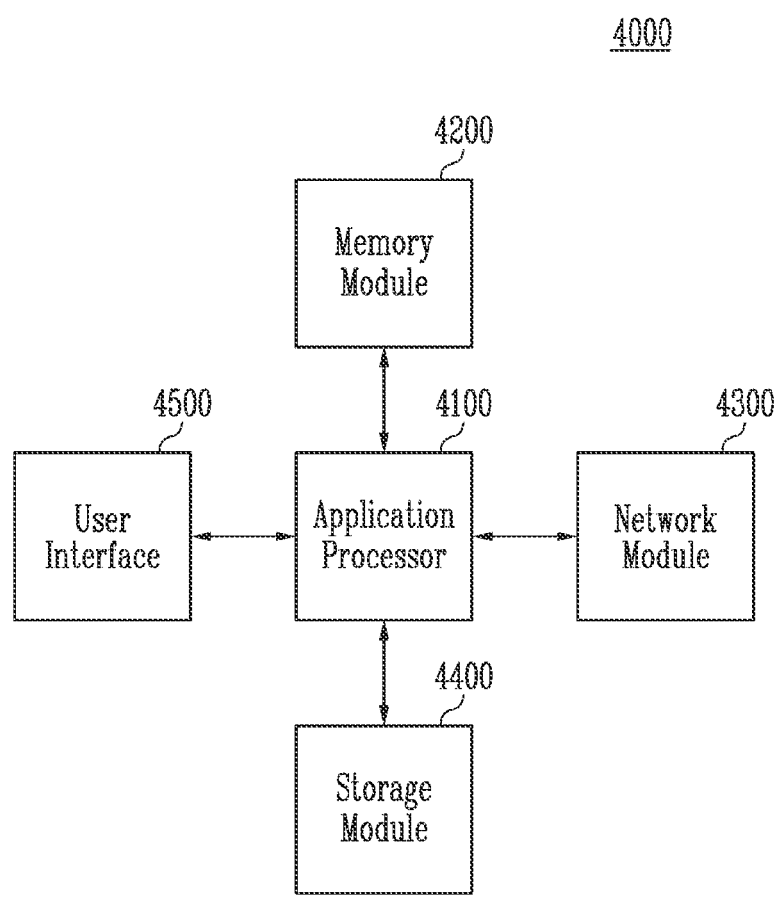
FIG. 16 is a block diagram illustrating a user system to which the storage device is applied in accordance with an embodiment of the present disclosure.

FIG. 16 is a block diagram illustrating a user system to which the storage device is applied in accordance with an embodiment of the present disclosure.

Referring to FIG. 16, the user system 4000 includes an application processor 4100, a memory module 4200, a network module 4300, a storage module 4400, and a user interface 4500.

The application processor 4100 may drive components included in the user system 4000, an operating system (OS), a user program, or the like. The application processor 4100 may include controllers for controlling components included in the user system 4000, interfaces, a graphic engine, and the like. The application processor 4100 may be provided as a System-on-Chip (SoC).

The memory module 4200 may operate as a main memory, working memory, buffer memory or cache memory of the user system 4000. The memory module 4200 may include volatile random access memories such as a DRAM, an SDRAM, a DDR SDRAM, a DDR2 SDRM, a DDR3 SDRAM, an LPDDR SDRAM, an LPDDR2 SDRAM, and an LPDDR3 SDRAM or nonvolatile random access memories such as a PRAM, a ReRAM, an MRAM, and a FRAM. The application processor 4100 and the memory module 4200 may be provided as one semiconductor package by being packaged based on a Package on Package (PoP).

The network module 4300 may communicate with external devices. The network module 4300 may support wireless communications such as Code Division Multiple Access (CDMA), Global System for Mobile communication (GSM), Wideband CDMA (WCDMA), CDMA-2000, Time Division Multiple Access (TDMA), Long Term Evolution (LTE), WiMAX, WLAN, UWB, Bluetooth, and Wi-Fi. The network module 4300 may be included in the application processor 4100.

The storage module 4400 may store data. For example, the storage module 4400 may store data received from the application processor 4100. Alternatively, the storage module 4400 may transmit data stored therein to the application processor 4100. The storage module 4400 may be implemented with a nonvolatile semiconductor memory device such as a Phase-change RAM (PRAM), a Magnetic RAM (MRAM), a Resistive RAM (RRAM), a NAND flash, a NOR flash, or a NAND flash having a three-dimensional structure. The storage module 4400 may be provided as a removable drive such as a memory card of the user system 4000 or an external drive.

The storage module 4400 may include a plurality of nonvolatile memory devices, and the plurality of nonvolatile memory devices may operate identically to the memory device 100 described with reference to FIG. 1. The storage module 4400 may operate identically to the storage device 50 described with reference to FIG. 1.

The user interface 4500 may include interfaces for inputting data or commands to the application processor 4100 or outputting data to an external device. The user interface 4500 may include user input interfaces such as a keyboard, a keypad, a button, a touch panel, a touch screen, a touch pad, a touch ball, a camera, a microphone, a gyroscope sensor, a vibration sensor and a piezoelectric element. The user interface 4500 may include user output interfaces such as a Liquid Crystal Display (LCD), an Organic Light Emitting Diode (OLED) display device, an Active Matrix OLED (AMOLED) display device, a LED, a speaker, and a monitor.

In accordance with embodiments of the present disclosure, there can be provided a storage device capable of shortening a write time and a recovery time of mapping data after a sudden power off occurs.

While the present disclosure has been shown and described with reference to certain embodiments thereof, it will be understood by those skilled in the art that various changes in form and details may be made therein without departing from the spirit and scope of the present disclosure as defined by the appended claims and their equivalents. Therefore, the scope of the present disclosure should not be limited to the above-described embodiments but should be determined by not only the appended claims but also the equivalents thereof.

In the above-described embodiments, all operations may be selectively performed or part of the operations may be omitted. In each embodiment, the operations are not necessarily performed in accordance with the described order and may be rearranged. The embodiments disclosed in this specification and drawings are only examples to facilitate an understanding of the present disclosure, and the present disclosure is not limited thereto. That is, it should be apparent to those skilled in the art that various modifications can be made on the basis of the technological scope of the present disclosure.

Furthermore, various embodiments of the present disclosure have been described in the drawings and specification. Although specific terminologies are used here, those are only to describe the embodiments of the present disclosure. Therefore, the present disclosure is not restricted to the above-described embodiments and many variations are possible within the spirit and scope of the present disclosure. It should be apparent to those skilled in the art that various modifications can be made on the basis of the technological scope of the present disclosure in addition to the embodiments disclosed herein and the following claims. Furthermore, the embodiments may be combined to form additional embodiments.

What is claimed is:

1. A memory controller comprising:
a program operation controller configured to control a memory device to store data and individual mapping information as logical address information corresponding to a physical address of each page in which the data is stored in a first memory block included in the memory device;
a mapping information storage configured to store therein mapping information including information on logical addresses and physical addresses;
a mapping information update controller configured to control the memory device to store the mapping information in a second memory block included in the memory device, and perform an update operation of updating the mapping information stored in the second memory block for each predetermined period; and
a Sudden Power Off Recovery (SPOR) controller configured to receive, in response to a sudden power off occurring while the data is stored in the first memory block, the individual mapping information from the memory device, and recover, in response to the sudden power off occurring, the mapping information stored in the mapping information storage based on the individual mapping information, and provide the recovered mapping information to the mapping information storage,
wherein the mapping information update controller delays, in response to sequentiality of a predetermined number or more of logical addresses being maintained after the predetermined period is over, the update operation until the sequentiality is broken,
wherein the predetermined number is an integer greater than 1, and
wherein the SPOR controller recovers, in response to the update operation being delayed, the mapping information for the data stored in the first memory block during a delay section from a time point at which the update operation is delayed to a time point at which the sudden power off occurs, based on logical address information and physical address information of data firstly stored in the first memory block after the update operation is delayed and logical address information of data lastly stored in the first memory block before the sudden power off occurs.

2. The memory controller of claim 1, wherein the predetermined period is a time required to complete a program operation corresponding to a default number of logical addresses.

3. The memory controller of claim 2, wherein the SPOR controller is further configured to acquire, from the memory device, physical address information stored in a reference page in the first memory block as a page storing therein the data at a time point at which the mapping information is lastly updated before the sudden power off occurs, and
determine, in response to the data existing in a (the default number+1)th page, that the update operation is delayed by reading (the default number+1) number of pages from the reference page.

4. The memory controller of claim 3, wherein the SPOR controller is further configured to acquire, in response to the update operation being delayed, the individual mapping information stored in the first memory block from the time point at which the mapping information is lastly updated to a time point at which the predetermined period is over, and to recover the mapping information for the data stored in the first memory block from the time point at which the mapping information is lastly updated to the time point at which the predetermined period is over by using the individual mapping information.

5. The memory controller of claim 1, wherein the recovered mapping information for the data stored in the first memory block during the delay section includes a logical address and a physical address of the data firstly stored in the first memory block after the update operation is delayed and length information of the data stored in the first memory block during the delay section.

6. The memory controller of claim 1, wherein the SPOR controller is configured to generate length information of the data stored in the first memory block during the delay section, based on the logical address information of the data firstly stored in the first memory block after the update operation is delayed and the logical address information of the data lastly stored in the first memory block before the sudden power off occurs, and
provide the mapping information update controller with the logical address information and the physical address information of the data firstly stored in the first memory block after the update operation is delayed and the length information.

7. The memory controller of claim 1, wherein the mapping information update controller is configured to delay, in response to the sequentiality being maintained, the update operation until the data is stored in all pages included in the first memory block.

8. The memory controller of claim 1, wherein the mapping information includes consecutive logical addresses and corresponding consecutive physical addresses, which are represented by first ones of the respective logical and physical addresses and length information of data represented by the consecutive logical addresses.

9. A storage device comprising:
a memory device configured to store, in a first memory block, data and individual mapping information as logical address information corresponding to a physical address of each page in which the data is stored,
store mapping information including the logical address information and physical address information in a second memory block, and
update the mapping information stored in the second memory block for each predetermined period; and
a memory controller including a mapping information storage configured to store the mapping information and configured to control the memory device to delay, in response to sequentiality of a predetermined number or more of logical addresses being maintained after the predetermined period is over, an update operation for the mapping information until the sequentiality is broken, perform, in response to a sudden power off occurring while the data is stored in the first memory block after the update operation is delayed, an operation of recovering the mapping information on the data stored in the first memory block during a delay section from a time point at which the update operation is delayed to a time point at which the sudden power off occurs, based on logical address information and physical address information of data firstly stored in the first memory block after the update operation is delayed and logical address information of data lastly stored in the first memory block before the sudden power off occurs, and storing the recovered mapping information in the mapping information storage, wherein the predetermined number is an integer greater than 1.

10. The storage device of claim 9, wherein the predetermined period is a time required to complete a program operation corresponding to a default number of logical addresses.

11. The storage device of claim 9, wherein the memory device includes:

a peripheral circuit configured to read the data stored in the first memory block and the second memory block;

a mapping data read controller configured to control the peripheral circuit to perform an operation of reading the individual mapping information from the first memory block and reading the mapping information from the second memory block; and a mapping data storage configured to store the individual mapping information and the mapping information, and provide the memory controller with the logical address information and the physical address information of the data firstly stored in the first memory block after the update operation is delayed and the logical address information of the data lastly stored in the first memory block before the sudden power off occurs.

12. The storage device of claim 11, wherein the mapping data storage is further configured to provide the memory controller with physical address information stored in a reference page in the first memory block as a page storing therein the data at a time point at which the mapping information is lastly updated before the sudden power off occurs, and wherein the memory controller is further configured to acquire the data stored in (a default number+1) number of pages from the reference page based on physical address information of the reference page, and to determine that the update operation is delayed in response to the data existing in a (the default number+1)th page.

13. The storage device of claim 12, wherein the mapping data read controller is configured to control the peripheral circuit to acquire logical address information and physical address information of the data stored during the predetermined period by reading, from the first memory block, the (the default number+1)th page from the reference page according to a request of the memory controller, search for a target page in which the data lastly stored before the sudden power off occurs is stored by using a binary search method, and acquire logical address information for the data lastly stored before the sudden power off occurs by reading the target page, and wherein the mapping data storage is configured to store the logical address information and the physical address information of the data firstly stored in the first memory block after the update operation is delayed and logical address information included in the target page, and provide the memory controller with the logical address information and the physical address information of the data firstly stored and the logical address information included in the target page according to a request of the memory controller.

14. The storage device of claim 9, wherein the recovered mapping information for the data stored in the first memory block during the delay section includes a logical address and a physical address of the data firstly stored in the first memory block after the update operation is delayed and length information of the data stored in the first memory block during the delay section.

15. A method of operating a storage device, the method comprising:

storing, in a first memory block included in a memory device, data and individual mapping information as logical address information corresponding to a physical address of each page in which the data is stored;

storing mapping information including the logical address information and physical address information in a second memory block included in the memory device and a mapping information storage in a memory controller;

updating the mapping information stored in the second memory block for each predetermined period;

delaying, in response to sequentiality of a predetermined number or more of logical addresses being maintained after the predetermined period is over, an update operation for the mapping information until the sequentiality is broken;

recovering, in response to a sudden power off occurring while the data is stored in the first memory block after the update operation is delayed, the mapping information for the data stored in the first memory block during a delay section from a time point at which the update operation is delayed to a time point at which the sudden power off occurs, based on logical address information and physical address information of data firstly stored in the first memory block after the update operation is delayed and logical address information of data lastly stored in the first memory block before the sudden power off occurs; and storing the recovered mapping information in the mapping information storage, wherein the predetermined number is an integer greater than 1.

16. The method of claim 15, wherein the predetermined period is a time required to complete a program operation corresponding to a default number of logical addresses, and further the method comprising determining, in response to the data existing in a (a default number+1)th page, that the update operation is delayed by reading (the default number+1) number of pages from a reference page in the first memory block as a page storing therein the data at a time point at which the mapping information is lastly updated before the sudden power off occurs.

17. The method of claim 16, further comprising:
acquiring logical address information and physical address information of the data stored during the predetermined period by reading the (the default number+1)th page from the reference page;
searching for a target page in which the data lastly stored before the sudden power off occurs is stored by using a binary search method; and
acquiring logical address information of the data lastly stored before the sudden power off occurs by reading the target page.

18. The method of claim 17,
wherein the recovering includes generating length information of the data stored in the first memory block during the delay section, based on the logical address information of the data firstly stored in the first memory block after the update operation is delayed and the logical address information of the data lastly stored in the first memory block before the sudden power off occurs, and
wherein the recovered mapping information for the data stored in the first memory block during the delay section includes a logical address and a physical address of the data firstly stored in the first memory block after the update operation is delayed and length information of the data stored in the first memory block during the delay section.

\* \* \* \* \*